(12) United States Patent
Hsiao et al.

(10) Patent No.: US 11,440,830 B2
(45) Date of Patent: Sep. 13, 2022

(54) EDGE DIRECTORS INCLUDING AN INTERIOR HEATING DEVICE

(71) Applicant: CORNING INCORPORATED, Corning, NY (US)

(72) Inventors: Chao Feng Hsiao, Taichung (TW); John Thomas Pine, III, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 210 days.

(21) Appl. No.: 16/608,300

(22) PCT Filed: Apr. 27, 2018

(86) PCT No.: PCT/US2018/029744
§ 371 (c)(1),
(2) Date: Oct. 25, 2019

(87) PCT Pub. No.: WO2018/200928
PCT Pub. Date: Nov. 1, 2018

(65) Prior Publication Data
US 2020/0095154 A1 Mar. 26, 2020

Related U.S. Application Data

(60) Provisional application No. 62/491,384, filed on Apr. 28, 2017.

(51) Int. Cl.
*C03B 17/06* (2006.01)
(52) U.S. Cl.
CPC .................. *C03B 17/064* (2013.01)
(58) Field of Classification Search
CPC .............. C03B 17/064; C03B 18/10
See application file for complete search history.

(56) References Cited

U.S. PATENT DOCUMENTS 3,506,429 A * 4/1970 Overman ............... C03B 17/064
65/203
3,682,609 A * 8/1972 Dockerty .............. C03B 17/064
65/83

(Continued)

FOREIGN PATENT DOCUMENTS

| CN | 101128399 A | 2/2008 |
| CN | 101505556 A | 8/2009 |

(Continued)

OTHER PUBLICATIONS

International Search Report and Written Opinion of the International Searching Authority; PCT/US2018/029744; dated Nov. 20, 2018; 17 Pages; Korean Intellectual Property Office.

(Continued)

*Primary Examiner* — Jodi C Franklin

(57) ABSTRACT

An apparatus can include a wedge including a pair of inclined surface portions converging along a downstream direction to form a root of the wedge. The apparatus can further include an edge director intersecting with at least one of the pair of inclined surface portions. The edge director can include an interior cavity. In some embodiments, the apparatus can further include a heating device positioned within the interior cavity, wherein the heating device can include a plurality of heating segments. In further embodiments, the apparatus can further include a plurality of coils of wire positioned within the interior cavity, wherein each of the plurality of coils of wire can include windings that may be wound about a corresponding linear coil axis that extends in the downstream direction.

20 Claims, 14 Drawing Sheets

(56) References Cited

U.S. PATENT DOCUMENTS

| | | | |
|---|---|---|---|
| 8,176,753 B2 | 5/2012 | Kahlout et al. | |
| 9,512,025 B2* | 12/2016 | Chung | C03B 17/064 |
| 10,065,880 B2* | 9/2018 | Gross | H05K 5/03 |
| 10,968,134 B2* | 4/2021 | Gross | C03C 3/089 |
| 2002/0088253 A1* | 7/2002 | Roba | C03B 37/0124 65/481 |
| 2005/0183455 A1* | 8/2005 | Pitbladdo | C03B 17/064 65/29.11 |
| 2006/0016219 A1* | 1/2006 | Pitbladdo | G01F 1/6888 65/29.21 |
| 2006/0242994 A1* | 11/2006 | Boratav | C03B 17/064 65/90 |
| 2011/0100057 A1* | 5/2011 | Gaylo | C03B 17/064 65/90 |
| 2011/0209502 A1* | 9/2011 | El Kahlout | C03B 17/067 65/90 |
| 2012/0111060 A1* | 5/2012 | Tsuda | C03B 17/064 65/53 |
| 2012/0272688 A1* | 11/2012 | Kano | C03B 17/064 65/195 |
| 2013/0074549 A1* | 3/2013 | Ahrens | C03B 17/064 65/29.21 |
| 2013/0133370 A1* | 5/2013 | Boratav | C03B 17/064 65/84 |
| 2013/0319049 A1* | 12/2013 | Grzesik | C03B 17/064 65/53 |
| 2014/0144183 A1* | 5/2014 | Demirbas | C04B 35/64 65/134.4 |
| 2014/0318182 A1* | 10/2014 | Coppola | C03B 17/064 65/29.21 |
| 2015/0329401 A1* | 11/2015 | Chung | C03B 17/067 65/53 |
| 2016/0311716 A1* | 10/2016 | Chung | C03B 17/064 |
| 2018/0127303 A1* | 5/2018 | Gross | C03C 3/091 |
| 2019/0144323 A1* | 5/2019 | Oh | G01L 1/24 65/29.19 |
| 2020/0299173 A1* | 9/2020 | Coppola | C03B 17/064 |

FOREIGN PATENT DOCUMENTS

| | | |
|---|---|---|
| CN | 102765869 A | 11/2012 |
| CN | 103574884 A | 2/2014 |
| CN | 105050969 A | 11/2015 |
| CN | 105682275 A | 6/2016 |
| EP | 0763962 A2 | 3/1997 |
| JP | 58-026485 A | 2/1983 |
| JP | 01-171094 A | 7/1989 |
| JP | 2008-071728 A | 3/2008 |
| JP | 2011-178657 A | 9/2011 |
| JP | 2013-525241 A | 6/2013 |
| JP | 2015-527884 A | 9/2015 |
| JP | 2016-501815 A | 1/2016 |
| JP | 2016-505499 A | 2/2016 |
| JP | 2016-537288 A | 12/2016 |
| KR | 10-2015-0097697 A | 8/2015 |
| KR | 10-2017-0007395 A | 1/2017 |
| WO | 2011090893 A1 | 7/2011 |
| WO | 2014099560 A1 | 6/2014 |
| WO | 2015/175607 A1 | 11/2015 |
| WO | 2017/044553 A1 | 3/2017 |

OTHER PUBLICATIONS

"Chinese Patent Application No. 201880028090.1, Office Action dated Aug. 18, 2021; 12 pages (English Translation only); Chinese Patent Office."

Japanese Patent Application No. 2019-558772, Office Action dated Nov. 24, 2021, 10 pages (5 pages of English Translation and 5 pages of Original Copy); Japanese Patent Office.

Chinese Patent Application No. 201880028090.1, Office Action dated Feb. 8, 2022, 11 pages of English Translation, Chinese Patent Office.

Japanese Patent Application No. 2019-558772, Office Action dated Apr. 6, 2022, 6 pages (3 pages of English Translation and 3 pages of Original Document), Japanese Patent Office.

* cited by examiner

EDGE DIRECTORS INCLUDING AN INTERIOR HEATING DEVICE

CROSS-REFERENCE TO RELATED APPLICATIONS

This application is a national stage entry of International Patent Application Serial No. PCT/US2018/029744, filed on Apr. 27, 2018, which in turn, claims the benefit of priority under 35 U.S.C. § 119 of U.S. Provisional Application Ser. No. 62/491,384 filed on Apr. 28, 2017, the contents of each of which are relied upon and incorporated herein by reference in their entireties.

BACKGROUND

It is known to fusion draw molten material off a root of a forming wedge into a glass ribbon. It is also known to provide the forming wedge with edge directors to minimize attenuation of the width of the glass ribbon. However, excess cooling of the molten material contacting the surface of the edge directors may undesirably result in devitrification of the molten material into glass deposits on the surfaces of the edge directors. If allowed to form, such glass deposits may periodically break off and form imperfections in the glass ribbon. Furthermore, such glass deposits may reduce the wettability of the surfaces of the edge directors in contact with the molten material, thereby causing the molten material to prematurely pull away from the edge directors. Premature pulling away of the molten material from the edge directors can reduce fusion quality of the outer edge of the glass ribbon and result in undesired variation the width of the glass ribbon.

SUMMARY

The following presents a simplified summary of the disclosure to provide a basic understanding of some exemplary embodiments described in the detailed description. Unless otherwise noted, any of the example embodiments discussed below may optionally be used in combination with any one or more of the other embodiments discussed below.

The present disclosure relates generally to edge directors and, more particularly, to edge directors that include a heating device positioned within an interior cavity.

In accordance with some embodiments, an apparatus can include a wedge including a pair of inclined surface portions converging along a downstream direction to form a root of the wedge. The apparatus can further include an edge director intersecting with at least one of the pair of inclined surface portions. The edge director can include an interior cavity. The apparatus can also include a heating device positioned within the interior cavity. The heating device may include a plurality of heating segments at least partially encapsulated within a monolithic block.

In another embodiment, the heating segments can include a plurality of coils of wire.

In another embodiment, each of the plurality of coils of wire may include windings that are wound about a corresponding linear coil axis.

In another embodiment, a bracket can retain the heating device within the interior cavity.

In some embodiments, a method of fabricating the apparatus of any of the embodiments above can include arranging the plurality of heating segments at an orientation relative to one another. The method can further include moving material around the heating segments to at least partially encapsulate the heating segments within a common body of the material. The method can further include converting the common body of the material into the monolithic block containing all of the heating segments of the heating device.

In another embodiment, the method can include the plurality of heating segments being arranged within the interior cavity of the edge director and the material can be moved around the heating segments within the interior cavity of the edge director such that the common body of the material may be contained within the interior cavity of the edge director. The method can further include converting the common body of the material into the monolithic block while being positioned within the interior cavity of the edge director.

In another embodiment, the method can include positioning the heating device within the interior cavity after converting the common body of the material into the monolithic block.

In another embodiment, the method can include arranging the plurality of heating segments at the orientation relative to one another within a forming cavity of a mold. The method can further include moving the material around the heating segments within the forming cavity of the mold to at least partially encapsulate the heating segments within the common body of the material. The method can further include converting the common body of the material into the monolithic block while the plurality of heating segments are positioned within the forming cavity of the mold.

In another embodiment, the method can include removing the mold from the monolithic block prior to positioning the heating device within the interior cavity.

In another embodiment, the method can provide that the material may be moved around the heating segments includes cement.

In another embodiment, at least one alignment pin can interact with at least one heating segment of the plurality of heating segments to arrange the plurality of heating segments at the orientation relative to one another.

In another embodiment, an apparatus can include a wedge including a pair of inclined surface portions converging along a downstream direction to form a root of the wedge. The apparatus can further include an edge director intersecting with at least one of the pair of inclined surface portions. The edge director can include an interior cavity. The apparatus can also include a plurality of coils of wire positioned within the interior cavity. Each of the plurality of coils of wire can include windings that are wound about a corresponding linear coil axis extending in the downstream direction.

In another embodiment, the wire of each of the plurality of coils of wire is solid.

In another embodiment, each linear coil axis can extend along a common direction.

In another embodiment, the plurality of coils of wire can include at least a first set of coils of wire aligned along a first row, and a second set of coils of wire aligned along a second row offset from the first row.

In another embodiment, the second set of coils of wire can be staggered relative to the first set of coils of wire.

In another embodiment, at least one coil of wire can include windings that are wound about an alignment pin having an alignment axis extending in the downstream direction.

In another embodiment, the plurality of coils of wire may each be at least partially encapsulated within a monolithic block positioned within the interior cavity.

In another embodiment, the monolithic block may include cement.

In another embodiment, a bracket can retain the monolithic block within the interior cavity.

In another embodiment, a method of fabricating the apparatus of any of the embodiments above can include arranging the plurality of coils of wire. The method can further include moving material around the plurality of coils of wire to at least partially encapsulate each of the plurality of coils of wire within a common body of the material. The method can further include converting the common body of the material into a monolithic block containing each of the plurality of coils of wire.

In another embodiment, each of the plurality of coils of wire can be arranged within the interior cavity of the edge director. The material can be moved around each of the plurality of coils of wire within the interior cavity of the edge director such that the common body of the material may be contained within the interior cavity of the edge director. The common body of the material may be converted into the monolithic block while being positioned within the interior cavity of the edge director.

In another embodiment, wherein the each of the plurality of coils of wire may be positioned within the interior cavity after converting the common body of the material into the monolithic block.

In another embodiment, the method can include arranging each of the plurality of coils of wire within a forming cavity of a mold. The method can further include moving the material around each of the plurality of coils of wire to at least partially encapsulate each of the plurality of coils of wire within the common body of the material. The method can further include converting the common body of the material into the monolithic block while each of the plurality of coils of wire is positioned within the forming cavity of the mold.

In another embodiment, the method can include removing the mold from the monolithic block prior to positioning each of the plurality of coils of wire within the interior cavity.

In another embodiment, the method can further include inserting at least one alignment pin through a central axial path of at least one of the plurality of coils of wire and mounting the alignment pin to the mold to align the plurality of coils of wire at a predetermined orientation within the forming cavity of the mold.

In another embodiment, the material that is moved around each of the plurality of coils of wire can include cement.

In another embodiment, the monolithic block can include alumina. In another embodiment, the alumina can include from 95% to 98% of the monolithic block.

It is to be understood that both the foregoing general description and the following detailed description present embodiments of the present disclosure, and are intended to provide an overview or framework for understanding the nature and character of the embodiments as they are described and claimed. The accompanying drawings are included to provide a further understanding of the embodiments, and are incorporated into and constitute a part of this specification. The drawings illustrate various embodiments of the disclosure, and together with the description serve to explain the principles and operations thereof.

BRIEF DESCRIPTION OF THE DRAWINGS

These and other features, embodiments and advantages of the present disclosure can be further understood when read with reference to the accompanying drawings.

DETAILED DESCRIPTION

Figure 1:
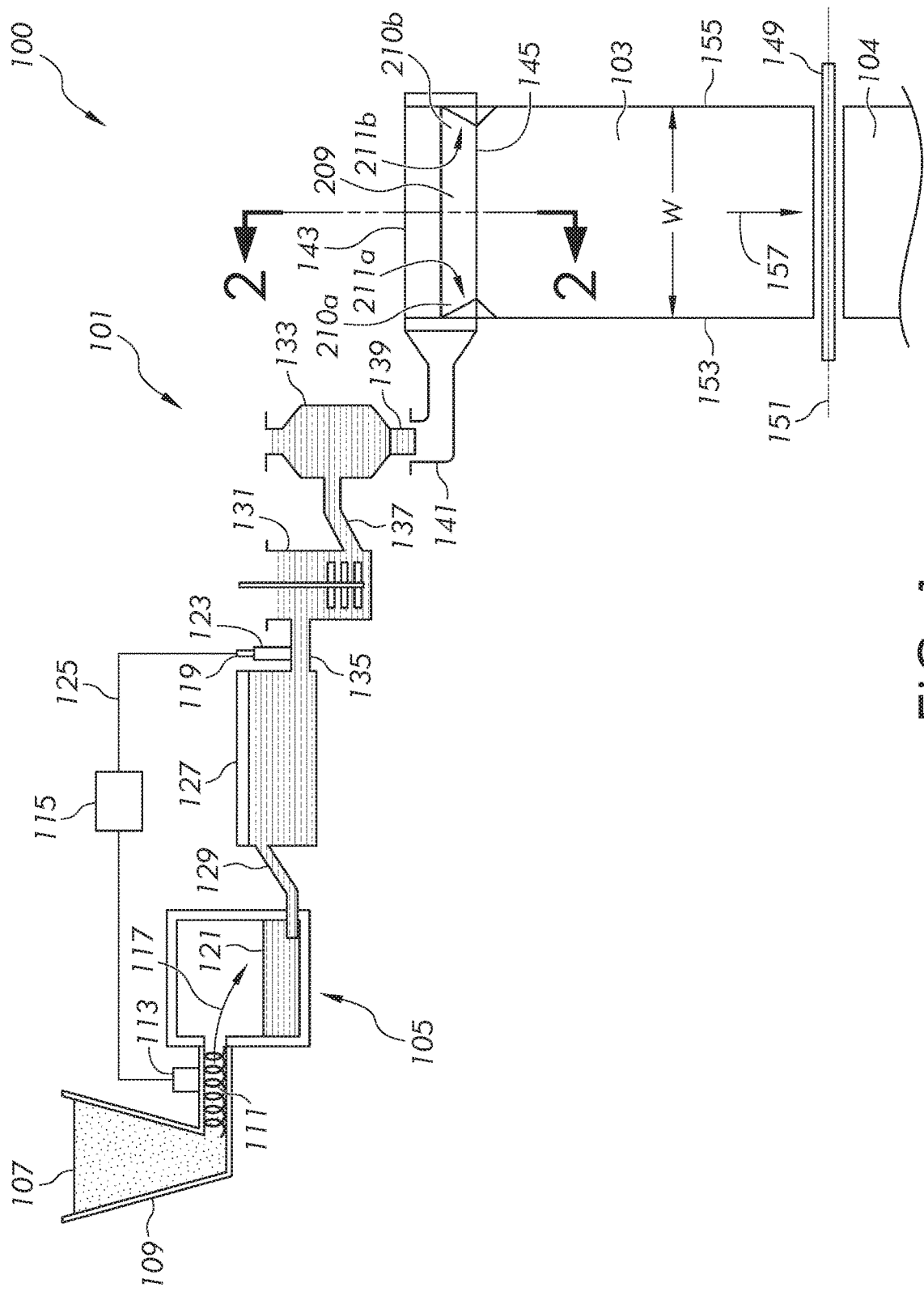
FIG. 1 schematically illustrates an apparatus for processing molten material including a fusion down-draw apparatus.

Apparatus and methods will now be described more fully hereinafter with reference to the accompanying drawings in which example embodiments are shown. Whenever possible, the same reference numerals are used throughout the drawings to refer to the same or like parts. However, this disclosure may be embodied in many different forms and should not be construed as limited to the embodiments set forth herein.

Glass sheets are commonly fabricated by a flowing molten glass to a forming body whereby a glass ribbon may be formed by a variety of ribbon forming processes, for example, slot draw, down-draw, or fusion down-draw. The glass ribbon from any of these processes may then be subsequently divided to provide sheet glass suitable for further processing into a desired display application. The glass sheets can be used in a wide range of display applications, for example liquid crystal displays (LCDs), electrophoretic displays (EPD), organic light emitting diode displays (OLEDs), plasma display panels (PDPs), or the like.

As may be appreciated, a glass sheet according to various embodiments may comprise one or more edges. In some embodiments, a glass sheet may be provided that has four edges and a generally square, rectangular, trapezoidal, parallelogram or other shape. Optionally, a round, oblong, or elliptical glass sheet may be provided that has one continuous edge. Other glass sheets having two, three, five, etc. edges may also be provided and are contemplated as being within the scope of the present description. Glass sheets of various sizes, including varying lengths, heights, and thicknesses, are also contemplated within the scope of the disclosure. In some embodiments, a nominal thickness of a central portion of the glass sheets can be less than or equal to about 1 mm, from about 50 μm to about 750 μm, from about 100 μm to about 700 μm, from about 200 μm to about 600 μm, from about 300 μm to about 500 μm, from about 50 μm to about 500 μm, from about 50 μm to about 700 μm, from about 50 μm to about 600 μm, from about 50 μm to about 500 μm, from about 50 μm to about 400 μm, from about 50 μm to about 300 μm, from about 50 μm to about 200 μm, from about 50 μm to about 100 μm, and all subranges of thicknesses therebetween.

FIG. 1 schematically illustrates an apparatus 100 for processing molten material comprising a fusion down-draw apparatus 101 for fusion drawing a glass ribbon 103 for subsequent processing into glass sheets 104. The fusion down-draw apparatus 101 can include a melting vessel 105 that receives batch material 107 from a storage bin 109. The batch material 107 can be introduced by a batch delivery device 111 powered by a motor 113. An optional controller 115 can be used to activate the motor 113 to introduce a desired amount of batch material 107 into the melting vessel 105, as indicated by arrow 117. A molten material probe 119 can be used to measure a molten material 121 level within a standpipe 123 and communicate the measured information to the controller 115 by way of a communication line 125.

The fusion down-draw apparatus 101 can also include a first conditioning station such as a fining vessel 127 located downstream from the melting vessel 105 and coupled to the melting vessel 105 by way of a first connecting conduit 129. In some embodiments, glass melt may be gravity fed from the melting vessel 105 to the fining vessel 127 by way of the first connecting conduit 129. For instance, gravity may act to drive the glass melt to pass through an interior pathway of the first connecting conduit 129 from the melting vessel 105 to the fining vessel 127. Within the fining vessel 127, bubbles may be removed from the glass melt by various techniques.

The fusion draw apparatus can further include a second conditioning station such as a glass melt mixing vessel 131 that may be located downstream from the fining vessel 127. The glass melt mixing vessel 131 can be used to provide a homogenous glass melt composition, thereby reducing or eliminating cords of inhomogeneity that may otherwise exist within the fined glass melt exiting the fining vessel. As shown, the fining vessel 127 may be coupled to the glass melt mixing vessel 131 by way of a second connecting conduit 135. In some embodiments, glass melt may be gravity fed from the fining vessel 127 to the glass melt mixing vessel 131 by way of the second connecting conduit 135. For instance, gravity may act to drive the glass melt to pass through an interior pathway of the second connecting conduit 135 from the fining vessel 127 to the glass melt mixing vessel 131.

The fusion draw apparatus can further include another conditioning station such as a delivery vessel 133 that may be located downstream from the glass melt mixing vessel 131. The delivery vessel 133 may condition the glass to be fed into a forming device. For instance, the delivery vessel 133 can act as an accumulator and/or flow controller to adjust and provide a consistent flow of glass melt to the forming vessel. As shown, the glass melt mixing vessel 131 may be coupled to the delivery vessel 133 by way of a third connecting conduit 137. In some embodiments, glass melt may be gravity fed from the glass melt mixing vessel 131 to the delivery vessel 133 by way of the third connecting conduit 137. For instance, gravity may act to drive the glass melt to pass through an interior pathway of the third connecting conduit 137 from the glass melt mixing vessel 131 to the delivery vessel 133.

As further illustrated, a downcomer 139 can be positioned to deliver molten material 121 from the delivery vessel 133 to an inlet 141 of a forming vessel 143. The glass ribbon 103 may then be fusion drawn off the root 145 of a forming wedge 209 and subsequently separated into the glass sheets 104 by a glass separation apparatus 149. As illustrated, the glass separation apparatus 149 may divide the glass sheet 104 from the glass ribbon 103 along a separation path 151 that extends along a width "W" of the glass ribbon 103 between a first outer edge 153 and a second outer edge 155 of the glass ribbon 103. As illustrated in FIG. 1, in some embodiments, the separation path 151 may extend substantially perpendicular to a draw direction 157 of the glass ribbon 103. In the illustrated embodiment, the draw direction 157 can be the fusion draw direction of the glass ribbon 103 being fusion down-drawn from the forming vessel 143.

Figure 2:
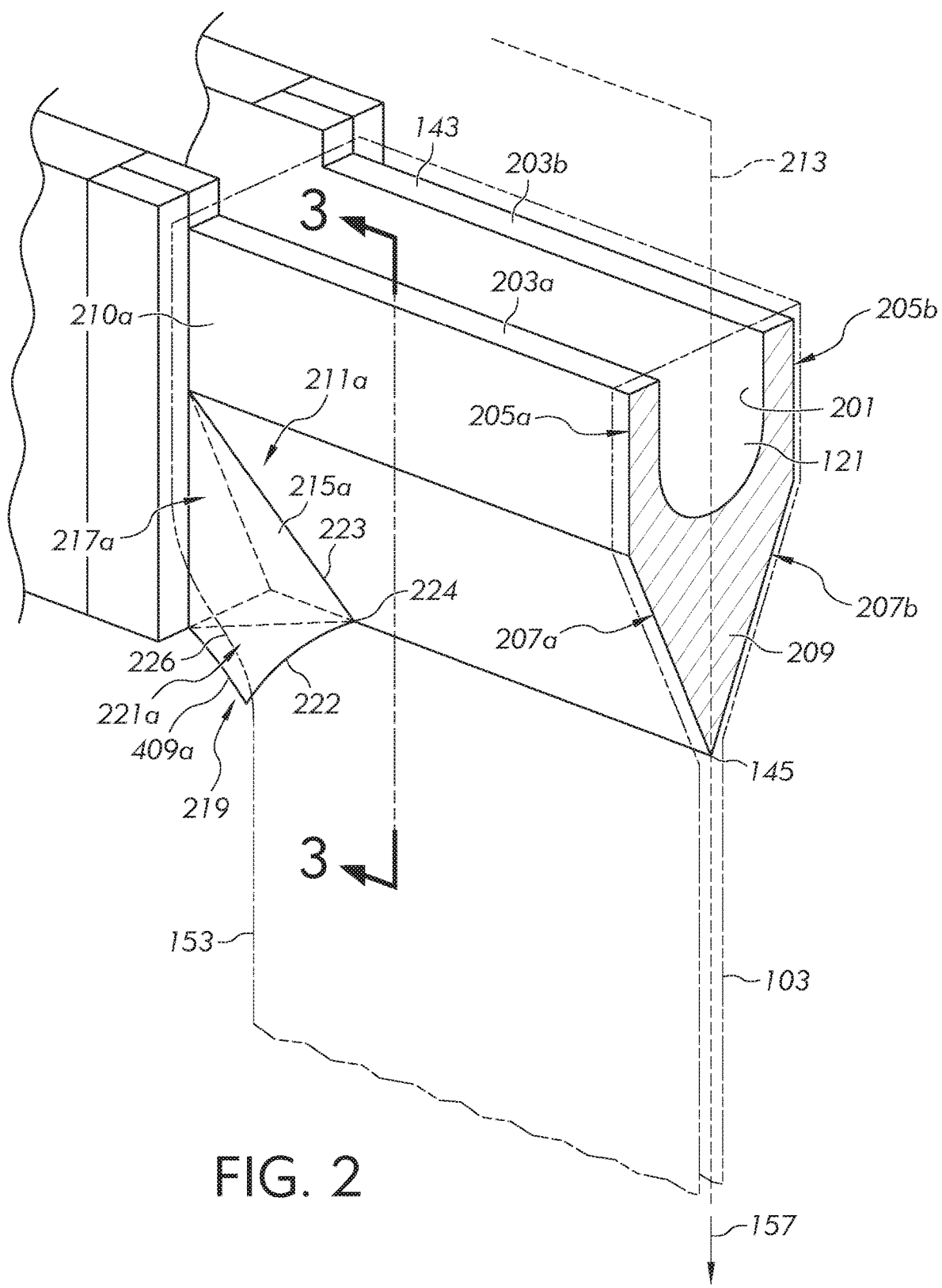
FIG. 2 illustrates a perspective cross-sectional view of the fusion down-draw apparatus taken along line 2-2 of FIG. 1.

FIG. 2 is a cross-sectional perspective view of fusion down-draw apparatus 101 along line 2-2 of FIG. 1. As shown, the forming vessel 143 can include a trough 201 oriented to receive the molten material 121 from the inlet 141. The forming vessel 143 can further include a forming wedge 209 including a pair of downwardly inclined converging surface portions 207a, 207b extending between opposed ends 210a, 210b (see FIG. 1) of the forming wedge 209. The pair of downwardly inclined converging surface portions 207a, 207b converge along the draw direction 157 to form the root 145. A draw plane 213 extends through the root 145 wherein the glass ribbon 103 may be drawn in the draw direction 157 along the draw plane 213. As shown, the draw plane 213 can bisect the root 145 although the draw plane 213 may extend at other orientations relative to the root 145.

Referring to FIG. 1, the first end 210a of the forming wedge 209 can be provided with a first edge director 211a. Likewise, the second end 210b of the forming wedge 209 can include a second edge director 211b that, in some embodiments, can be an identical mirror image of the first edge director 211a. The first edge director 211a will be described throughout the application with the understanding that such description can similarly or identically apply to the second edge director 211b as well. Indeed, in some embodiments, the configuration and methods of fabricating the second edge director 211b can be identical to the configuration and methods of fabricating first edge director 211a.

Figure 3:
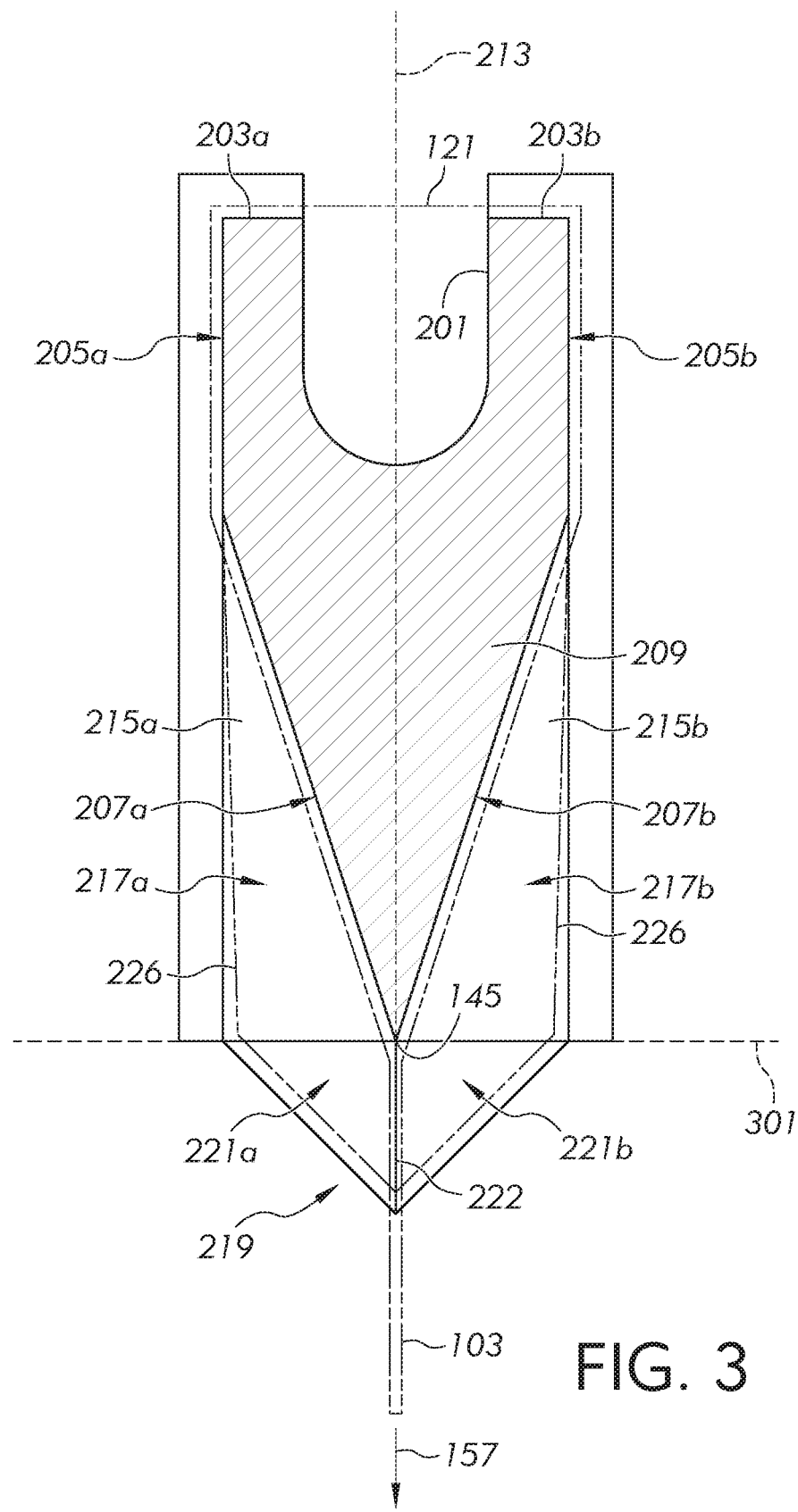
FIG. 3 illustrates a cross-sectional view of the fusion down-draw apparatus taken along line 3-3 of FIG. 2.

The first and second edge director 211a, 211b can each intersect with at least one of the pair of downwardly inclined surface portions 207a, 207b. For instance, as shown in FIGS. 2 and 3, the first edge director 211a can include a first upper portion 215a with a first outwardly facing contact surface 217a. As shown in FIG. 3, the first edge director 211a can further include a second upper portion 215b with a second outwardly facing contact surface 217b. The first outwardly facing contact surface 217a can intersect a first inclined converging surface portion 207a of the pair of downwardly inclined surface portions. Likewise, the second outwardly facing contact surface 217b can intersect a second inclined converging surface portion 207b of the pair of downwardly inclined surface portions. In the illustrated embodiment, the first and second outwardly facing contact surfaces 217a, 217b can be identical mirror images of one another although different configurations may be provided in further embodiments. As further illustrated, each of the outwardly facing contact surfaces 217a, 217b can extend along a corresponding flat plane although the surfaces may comprise a curved surface (e.g., outwardly facing concave surface) in further embodiments.

In some embodiments, the first edge director 211a can further include a lower portion 219 that can be considered the portion of the first edge director 211a that is positioned below a plane 301 (see FIG. 3) that can be perpendicular to the draw plane 213 (e.g., in a direction of gravity) and intersecting a point 224 (see FIG. 2) where an inner periphery 223 of the first edge director 211a intersects the root 145 of the forming wedge 209. The lower portion 219 can include a first outwardly facing contact surface 221a extending downwardly in the draw direction 157 from the first outwardly facing contact surface 217a of the first upper portion 215a to an inner edge 222. Likewise, the lower portion 219 can also include a second outwardly facing contact surface 221b extending downwardly in the draw direction 157 from the second outwardly facing contact surface 217b of the first upper portion 215b to the inner edge 222. As shown, the inner edge 222 can be positioned in the draw plane 213. As further shown, the first and second outwardly facing contact surfaces 221a, 221b can be identical mirror images of one another although different configurations may be provided in further embodiments. Each of the outwardly facing contact surfaces 221a, 221b can extend along an outwardly facing concave surface although the outwardly facing contact surfaces 221a, 221b may include flat or other surface shapes in further embodiments. As shown, the outwardly facing contact surfaces 221a, 221b can converge towards one another to the inner edge 222 disposed under the root 145 and in the draw plane 213.

The forming vessel 143 can be formed from a wide range of materials. In some embodiments, the forming vessel 143 can comprise a refractory material such as a refractory ceramic material. The first and second edge directors 211a, 211b can also be formed from a refractory material, such as a platinum or platinum alloy.

In some embodiments, the molten material 121 can flow from the inlet 141 into the trough 201 of the forming vessel 143. The molten material 121 can then overflow from the trough 201 by simultaneously flowing over corresponding weirs 203a, 203b and downward over the outer surfaces 205a, 205b of the corresponding weirs 203a, 203b. Respective streams of molten material 121 then flow along the downwardly inclined converging surface portions 207a, 207b of the forming wedge 209 to be drawn off the root 145 of the forming vessel 143, where the flows converge and fuse into the glass ribbon 103. The glass ribbon 103 may then be fusion drawn off the root 145 in the draw plane 213 along draw direction 157. The first and second edge directors 211a, 211b can act to increase the surface area that the molten streams contact as the molten streams, corresponding to the first outer edge 153 and the second outer edge 155, converge along the downwardly inclined converging surface portions 207a, 207b. Edges 226 of the streams of molten material corresponding to the outer edges 153, 155 spread out over, and contact, the first and second outwardly facing contact surfaces 217a, 217b of each edge director 211a, 211b, thereby increasing the effective width of the molten material streams. The molten material streams then converge together as they travel along, and contact, the first and second outwardly facing contact surfaces 221a, 221b of the lower portion 219 of each edge director 211a, 211b until the converging streams fuse together at the inner edge 222 of the lower portion 219 of the edge directors 211a, 211b to form the respective fused edges 153, 155 of the glass ribbon 103. Due to the increased surface area provided by the outwardly facing contact surfaces 217a, 217b of each edge director 211a, 211b, the corresponding width "W" of the glass ribbon 103 being drawn off can be increased, thereby countering attenuation of the width of the glass ribbon 103 that may occur due to surface tension of the molten material being drawn off the root 145 of the forming vessel 143.

Figure 4:
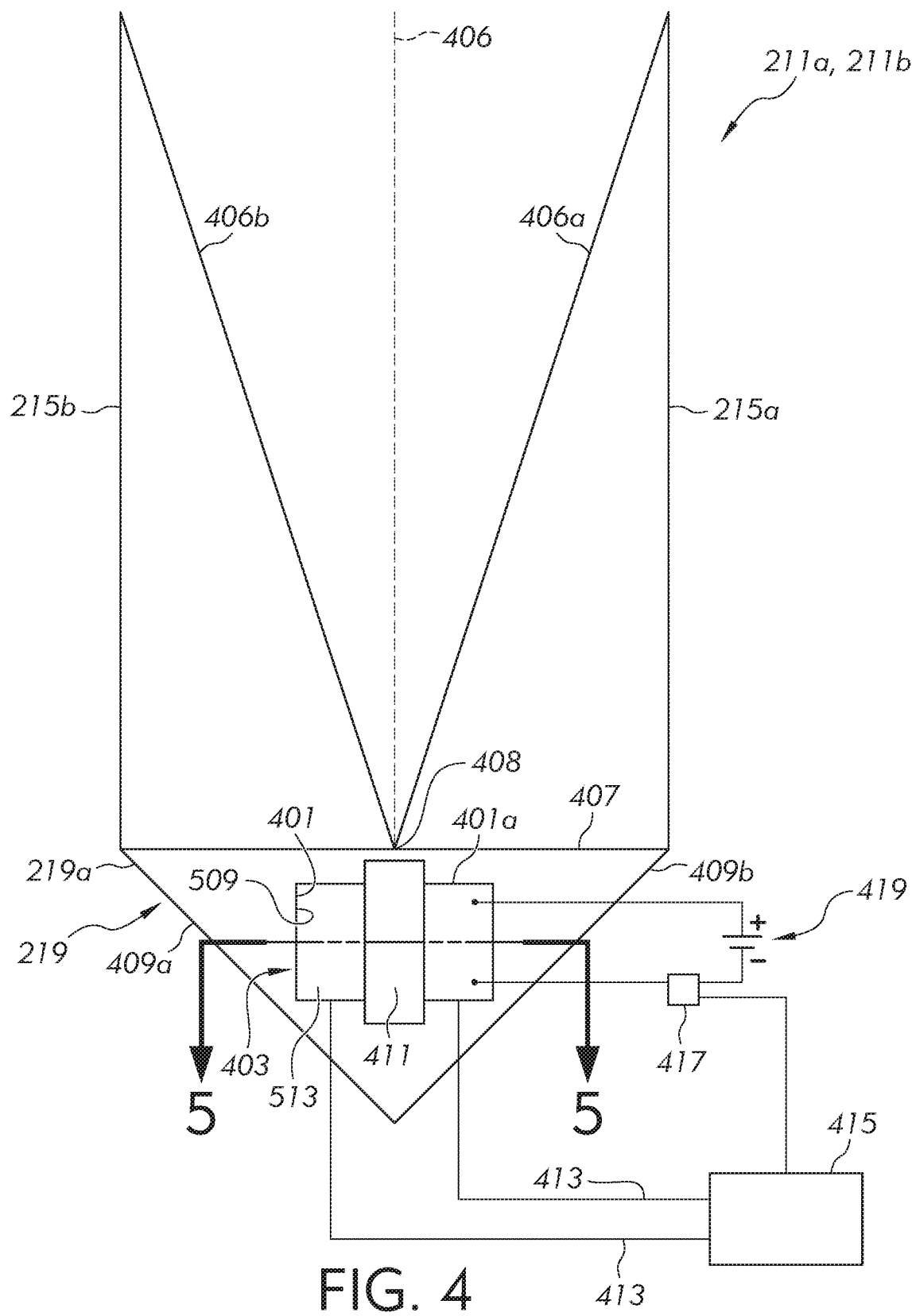
FIG. 4 is a rear view of the edge director illustrated in FIG. 3.
Figure 5:
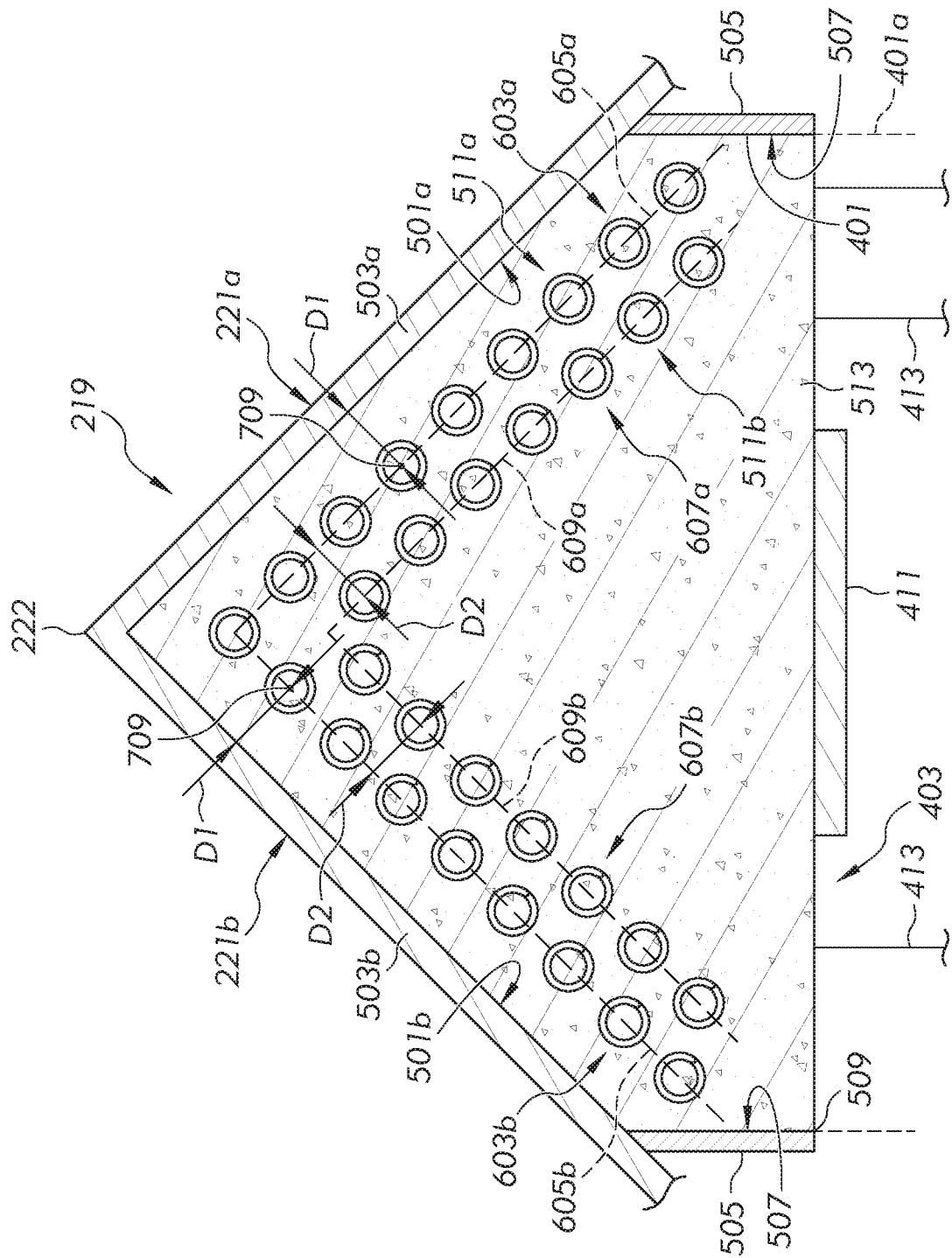
FIG. 5 is a cross-sectional view of the edge director along line 5-5 of FIG. 4.

Each edge director can include a heating device positioned within an interior cavity of the edge director. For instance, FIG. 4 illustrates a rear view of the edge director 211a, 211b. In some embodiments, the interior cavity 401 may be formed that may be open from a rear of the edge director to allow positioning of a heating device 403 within the interior cavity 401 from the rear of the edge director 211a, 211b. As shown in FIG. 5, the interior cavity 401 can be at least partially defined by interior surfaces 501a, 501b of walls 503a, 503b of the lower portion 219. In some embodiments, the interior cavity 401 may be entirely defined by interior surfaces 501a, 501b to maximize the size of the interior cavity 401 that can receive the heating device. Alternatively, as shown, the interior cavity 401 may optionally include lateral sidewalls 505 including an interior surface 507 that further defines the interior cavity 401. Indeed, as shown, the interior cavity 401 may optionally be defined by the both the interior surfaces 501a, 501b of the walls 503a, 503b and the interior surface 507 of the lateral sidewalls 505. In the illustrated embodiment, the walls 503a, 503b can respectively include the outwardly facing contact surfaces 221a, 221b that may be opposed to the corresponding interior surface 501a, 501b of the walls 503a, 503b. Consequently, heat from the heating device may be conducted through the thickness of the walls 503a, 503b from the interior surface 501a, 501b to the outwardly facing contact surface 221a, 221b.

As shown, the footprint 401a of the interior cavity 401 in a direction parallel to the draw plane 213 can be less than a footprint 219a of the lower portion 219 of the edge director 211a, 211b in the direction parallel to the draw plane 213. In some embodiments, as shown in FIG. 5, the peripheral edges of the footprint 401a, can be defined by the interior surface 507 of the lateral sidewalls 505 at an opening 509 of the interior cavity 401.

As shown in FIG. 4, in some embodiments, the footprint 219a of the lower portion 219 can comprise a triangular footprint with a first side 407 of the triangular footprint defined by the interface between the upper portion 215a, 215b and the lower portion 219 along the plane 301. Indeed, inner converging surfaces 406a, 406b of the upper portion 215a, 215b can meet at an angular pocket 408 designed to receive the root 145 of the forming wedge 209. The first side 407 of the triangular footprint can be defined along a plane perpendicular to a plane 406 bisecting the angular pocket 408. When the edge directors 211a, 211b are installed on the forming wedge 209, the plane 406 of the edge directors 211a, 211b can be coincident with the draw plane 213. As shown, in addition to the first side 407, the triangular footprint can be further defined by second and third sides 409a, 409b that are defined by the lateral periphery of the outwardly facing contact surfaces 221a, 221b of the lower portion 219. While the footprint 219a of the lower portion 219 may be triangular, the footprint may be other shapes in further embodiments.

As shown, the footprint 401a of the interior cavity 401 can optionally comprise a rectangular shape although a triangular or other polygonal shape may be provided in further embodiments. Furthermore, the shape of the footprint 401a of the interior cavity 401 may comprise a circular, elliptical or other curvilinear shape in further embodiments. Still further, the footprint 401a of the interior cavity 401 can be geometrically similar to the footprint 219a of the lower portion 219. For instance, the footprint of the interior cavity 401 may comprise a triangular shape that, in some embodiments, may be equal to or smaller than the triangular shape of the footprint 219a of the lower portion 219. Providing geometrically similar footprints 401*a*, 219*a* may allow positioning of a larger heating device within the interior cavity and can direct more heat to the contact surfaces 221*a*, 221*b*, thereby enhancing heating capacity and efficiency of the heating device.

As shown, the interior cavity 401 can be positioned entirely within the lower portion 219 although the interior cavity 401 may be positioned at least partially or entirely within the upper portion 215*a*, 215*b* in further embodiments. In some embodiments, as shown, the interior cavity 401 can be positioned entirely within the lower portion 219 of the edge directors 211*a*, 211*b* to target heat application to the lower portion of the edge directors 211*a*, 211*b* that may be most susceptible to devitrification of the molten material on to the edge directors. Furthermore, targeting the heat application to the lower portion of the edge director can avoid unnecessarily heating the edges of the glass ribbon that may otherwise result in undesired attenuation of the width of the glass ribbon being drawn from the apparatus.

Features of the disclosure therefore include the forming wedge 209 including the pair of downwardly inclined surface portions 207*a*, 207*b* that may converge along a downstream direction (e.g., the draw direction 157) to form the root 145 of the forming wedge 209. The first edge director 211*a* and the second edge director 211*b* may each intersect with at least one of the pair of downwardly inclined surface portions 207*a*, 207*b*. Indeed, as shown, the first outwardly facing contact surface 217*a* of the first upper portion 215*a* can intersect with the first downwardly inclined surface portion 207*a* and the second outwardly contact surface 217*b* of the second upper portion 215*b* can intersect with the second downwardly inclined surface portion 207*b*.

In further embodiments, as shown, a heating device 403 may be positioned within the interior cavity 401. As shown in FIG. 5, for example, the heating device 403 can include a plurality of heating segments 511*a*, 511*b* that may be at least partially encapsulated within a monolithic block 513. In some embodiments of the disclosure, the heating segments 511*a*, 511*b* may be provided without the monolithic block 513 depending on the particular application. In further embodiments, the monolithic block 513 may be provided to facilitate assembly and assist in the transfer of heat from the heating segments 511*a*, 511*b* to the edge directors 211*a*, 211*b*. In some embodiments, the monolithic block may be fabricated from a material that provides high thermal conductivity to allow heat to be transferred from the heating segments 511*a*, 511*b* to the outwardly facing contact surfaces 221*a*, 221*b* of the lower portion 219 of the edge directors 211*a*, 211*b*. In further embodiments, the monolithic block can be fabricated from a material that provides electrical insulation to prevent electrical leakage or shorting between adjacent heating segments. In some embodiments, the monolithic block can be fabricated from a material that may be poured into a cavity with predetermined shape to be converted into a solid monolithic block including the predetermined shape. In some embodiments, as shown, the material of the monolithic block 215 may comprise cement that can be poured and then cast into the predetermined shape. In some embodiments, the material of the monolithic block can comprise alumina to provide thermal conductivity and electrical insulation. In some embodiments, the alumina includes from 95% to 98% of the monolithic block 513.

As schematically shown in FIG. 4, a bracket 411 may be provided to help maintain the position of the heating device 403 within the interior cavity 401 of the edge directors 211*a*, 211*b*. In alternative embodiments, the bracket 411 may not be necessary. For instance, if the heating device 403 is cast directly into the interior cavity 401, the heating device 403 may be integrally formed within the interior cavity 401. In further embodiments, even if the heating device 403 is not directly cast into the interior cavity 401, an adhesive layer, such as a cement layer or other interface may be provided between the interior surface of the interior cavity 401 and the heating device 403 to mount the heating device 403 within the interior cavity 401.

Figure 7:
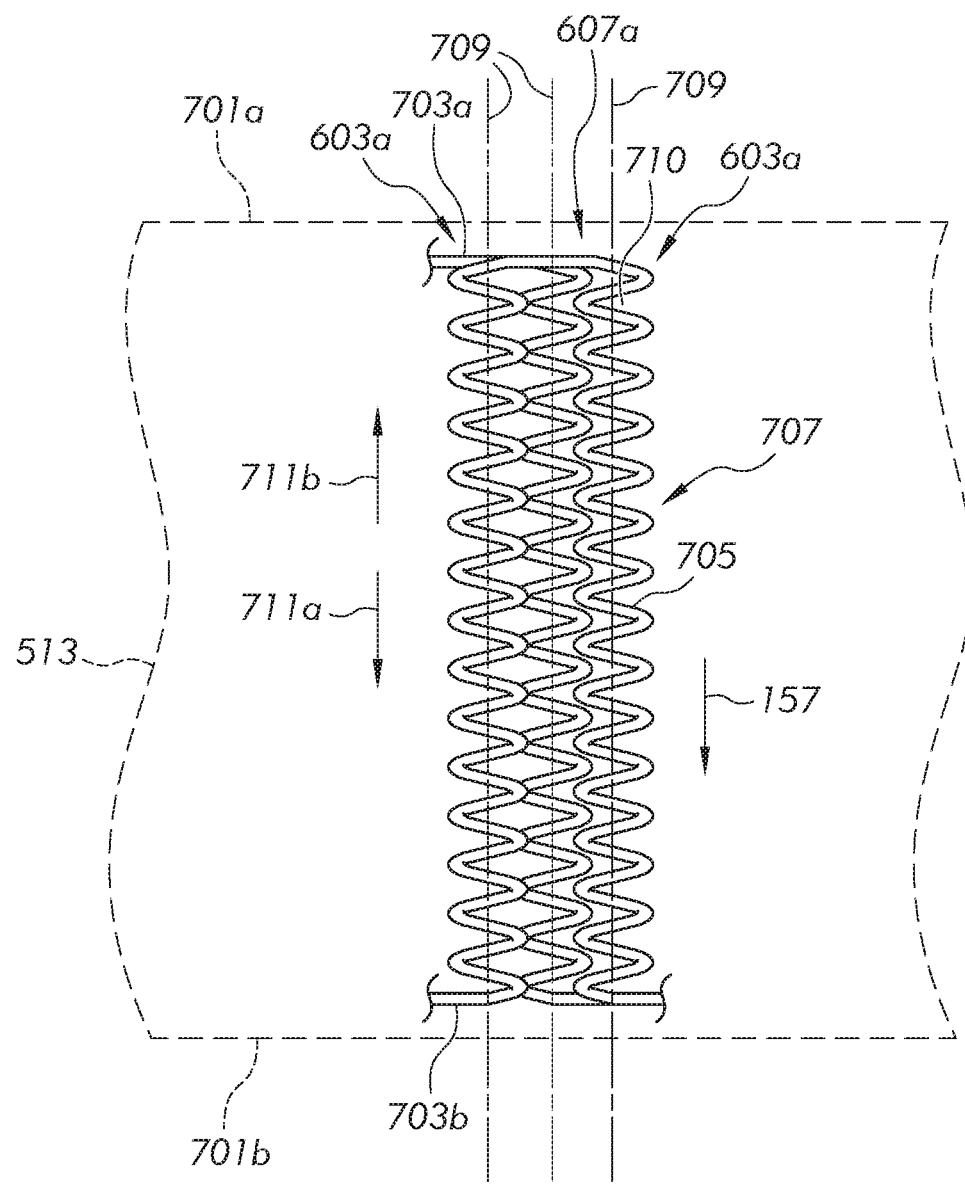

As shown schematically in FIG. 7, the upper surface 701*a* and lower surface 701*b* of the monolithic block 513 may be respectively located above and below the upper end 703*a* and lower end 703*b* of the heating segments 511*a*, 511*b* such that the heating segments are entirely encapsulated within the monolithic block 513. As further illustrated in FIG. 7, each heating segment may be formed from a coil 705 of wire 707 that, as shown, can include windings that are wound along a coil axis 709 of each heating segment. As illustrated the windings of the coils of wire are entirely encapsulated within the monolithic block 513. In some embodiments, the encapsulated coils of wire may have a central axial path 710 including the coil axis 709 that are optionally filled with the same material as the monolithic block or other material although no material may be provided in further embodiments. Understandably, electrical leads to the heating segments may extend from outside of the monolithic block 513 to the heating segments that may be entirely encapsulated within the monolithic block wherein the heating segments provide substantially all of the heating of the heating device 403 within the interior cavity 401. As shown in FIG. 7, the coil axis 709 of the central axial path 710 can comprise a linear axis although a curved or other shaped axis may be provided in further embodiments. Furthermore, optionally, each coil axis (e.g., linear coil axis) may extend along a common direction such that the coil axes are parallel with respect to one another.

Figure 6:
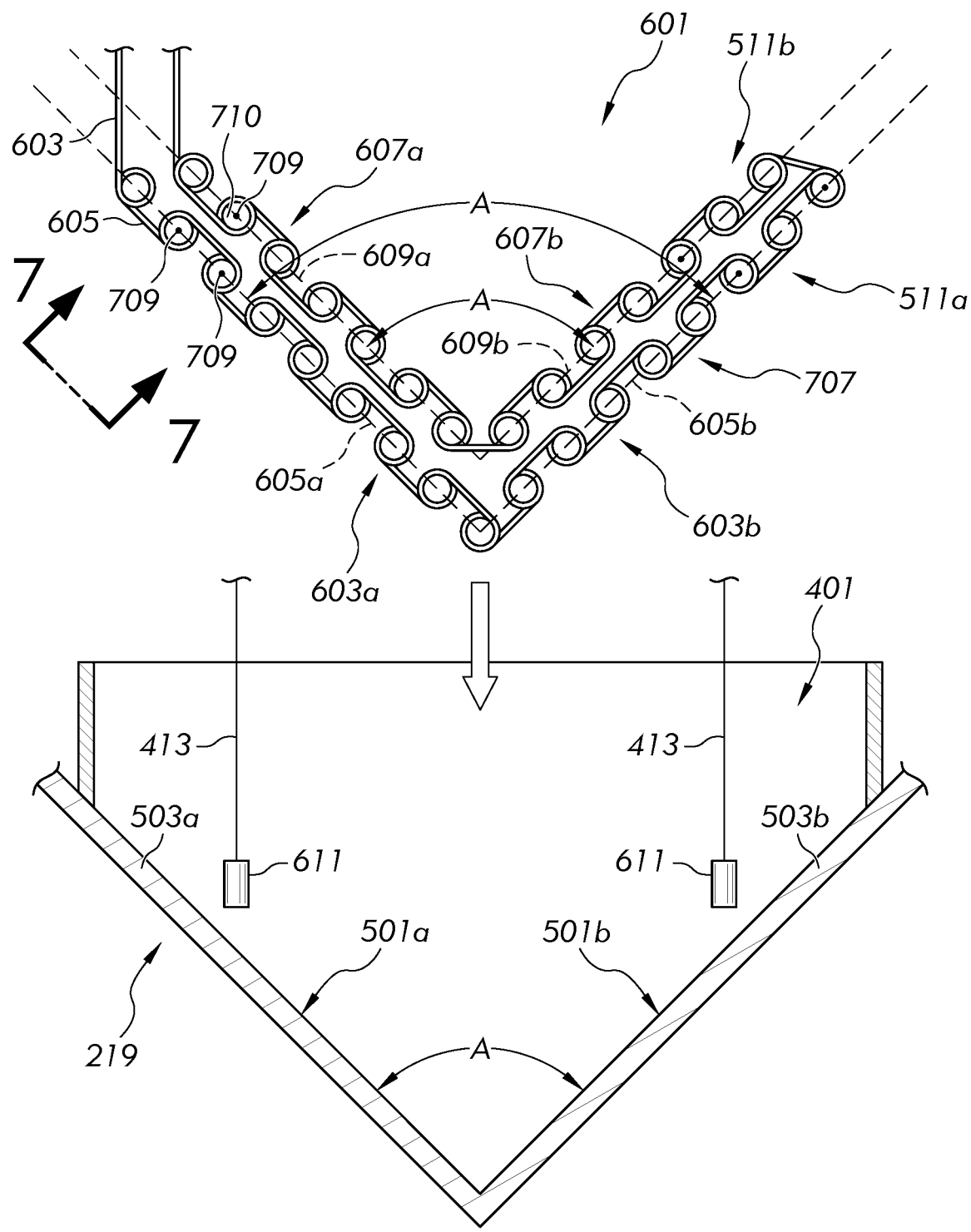
FIGS. 6-9 illustrate features of one example embodiment of methods of fabricating the edge directors of FIGS. 1-5.

In some embodiments, as shown in FIG. 6, the heating segments 511*a*, 511*b* may be integrated together into a single continuous heating element 601 that works together as a single unit. Although the heating segments may be provided as a plurality of heating elements that work independently from one another or connected together to work together as a single unit, the illustrated single continuous heating element 601 can simplify fabrication and of the heating device 403. To fabricate the single continuous heating element 601, a single continuously formed wire 707 may be bent or otherwise fabricated into the single continuous heating segment 601. In some embodiments, as shown in FIG. 6, at least one, a plurality, or every coil of the heating device may include windings that are wound about a corresponding coil axis 709 such as the illustrated linear coil axis. In some embodiments, a first portion 603 (see FIG. 6) of the wire 707 may be wound into an upper winding at an upper end 703*a* (see FIG. 7) of a first outer heating segment 511*a* and wound in direction 711*a* along the coil axis 709 to a lower winding at a lower end 703*b* to form a first heating coil. Referring to FIG. 6 the wire can then travel to form segment 605 to be bent into a lower winding of a second outer heating segment 511*a* adjacent to the first outer heating segment. The wire can then be wound in direction 711*b* along the coil axis 709 to an upper winding at the upper end 703*a* of the second outer heating segment 511*a* to form a second heating coil adjacent the first heating coil. In some embodiments, as shown in FIGS. 6 and 7, the wire can be successively wound up and down into a series of adjacent heating windings 511*a*, 511*b* to form a series of adjacent heating coils of wire until the heating element 601 is formed. The wire can be designed for electrical resistance heating and may be a solid wire to reduce the volume of the wire. In further embodiments, the wire may comprise platinum or a platinum containing alloy that can withstand high temperature conditions to provide sufficient heat without failure of the heating element. Furthermore, the wire can include a wide range of diameters. In some embodiments, the wire can have a diameter to provide desired heating characteristics with a minimal amount of material to reduce the cost of the heating element 601.

Various patterns of heating elements may be provided. For instance, with further reference to FIG. 6, a first set of outer heating coils of wire 603a of the outer heating segments 511a may be aligned along a first part of a row with its coil axes 709 parallel with respect to one another and extending along a first outer common plane 605a. Likewise, a second set of outer heating coils of wire 603b of the outer heating segments 511a may be aligned along a second part of a row with its coil axes 709 parallel with respect to one another and extending along a second outer common plane 605b. In some embodiments, an angle "A" between the first outer common plane 605a and the second outer common plane 605b can be the same angle "A" between the interior surfaces 501a, 501b of the walls 503a, 503b. As such, as shown in FIG. 5, a distance "D1" between the axes of the outer heating coils of wire of the outer heating segments 511a and the respective interior surfaces 501a, 501b can be maintained substantially the same such that each of the outer heating coils of wire may optionally provide consistent heating to the walls 503a, 503b to provide uniform heating of the corresponding surfaces of the edge directors contacting the molten material flowing over the edge directors. Uniform heating can help maintain the minimum desired temperature to avoid devitrification of the molten material without temperature spikes along the edge directors that may unnecessarily raise the temperature of the molten material to a point where undesired attenuation of the width of the drawn ribbon may occur.

In some embodiments, the heating segments may include inner heating segments 511b that can be located farther away from the respective interior surfaces 501a, 501b than the outer heating segments 511a. For instance, with further reference to FIG. 6, a first set of inner heating coils of wire 607a of the inner heating segments 511b may be aligned along a first part of a row with its coil axes 709 parallel with respect to one another and extending along a first inner common plane 609a. Likewise, a second set of inner heating coils of wire 607b of the inner heating segments 511b may be aligned along a second part of a row with its coil axes 709 parallel with respect to one another and extending along a second inner common plane 609b. In some embodiments, an angle "A" between the first inner common plane 609a and the second inner common plane 609b can be the same angle "A" between the interior surfaces 501a, 501b of the walls 503a, 503b and the same angle "A" between the first outer common plane 605a and the second outer common plane 605b.

As such, as shown in FIG. 5, a distance "D1" between the axes of the outer heating segments 511a and the respective interior surface 501a, 501b can be maintained substantially the same such that each of the outer heating segments 511a may optionally provide consistent heating to the walls 503a, 503b to provide uniform heating of the corresponding surfaces of the edge directors contacting the molten material flowing over the edge directors. Uniform heating can help maintain the minimum desired temperature to avoid devitrification of the molten material without temperature spikes along the edge directors that may unnecessarily raise the temperature of the molten material to a point where undesired attenuation of the width of the drawn ribbon may occur.

Optionally incorporating the inner heating segments 511b in addition to the outer heating segments 511a can provide layering of heating segments to increase the rate of heat transfer to the walls 503a, 503b. While two layers of heating segments are provided, in further embodiments a single layer of heating segments may provide the desired result or three or more layers of heating segments may be provided to further increase the rate of heat transfer to the walls 503a, 503b.

In one embodiment, as shown in FIG. 5, the outer heating segments 511a, 511b can be optionally provided as the above-referenced heating coils of wire with the first set of outer heating coils of wire 603a and the second set of outer heating coils of wire 603b aligned in series along respective outer rows. The above-referenced heating coils of wire can further include the first set of inner heating coils of wire 607a and the second set of inner heating coils of wire 607b aligned in series along respective inner rows that are respectively offset (by distance "D2") from the outer rows. While two rows are illustrated, one or any plurality of rows may be provided in further embodiments. The distance "D2" can be small enough to permit high density packing of the heating coils of wire to permit enhanced heat transfer to the walls 503a, 503b while also maintaining a minimum distance to avoid shorting or reducing electrical loss between adjacent coils of wire. To provide further high density packing of the heating coils of wire, inner heating coils of wire may be staggered relative to outer heating coils of wire. Indeed, as shown in FIG. 7, the coil axis 709 of an inner heating coil of the inner heating coils of wire 607a may be offset from the coil axes 709 and positioned between the coil axes 709 of a corresponding adjacent pair of outer heating coils of wire 603a. Consequently, as shown in FIG. 6, the first set of inner heating coils of wire 607a of the inner heating segments 511b can be staggered relative to the first set of outer heating coils of wire 603a of the outer heating segments 511a. Likewise, the second set of inner heating coils of wire 607b of the inner heating segments 511b can be staggered relative to the second set of outer heating coils of wire 603b of the outer heating segments 511a.

Figure 17:
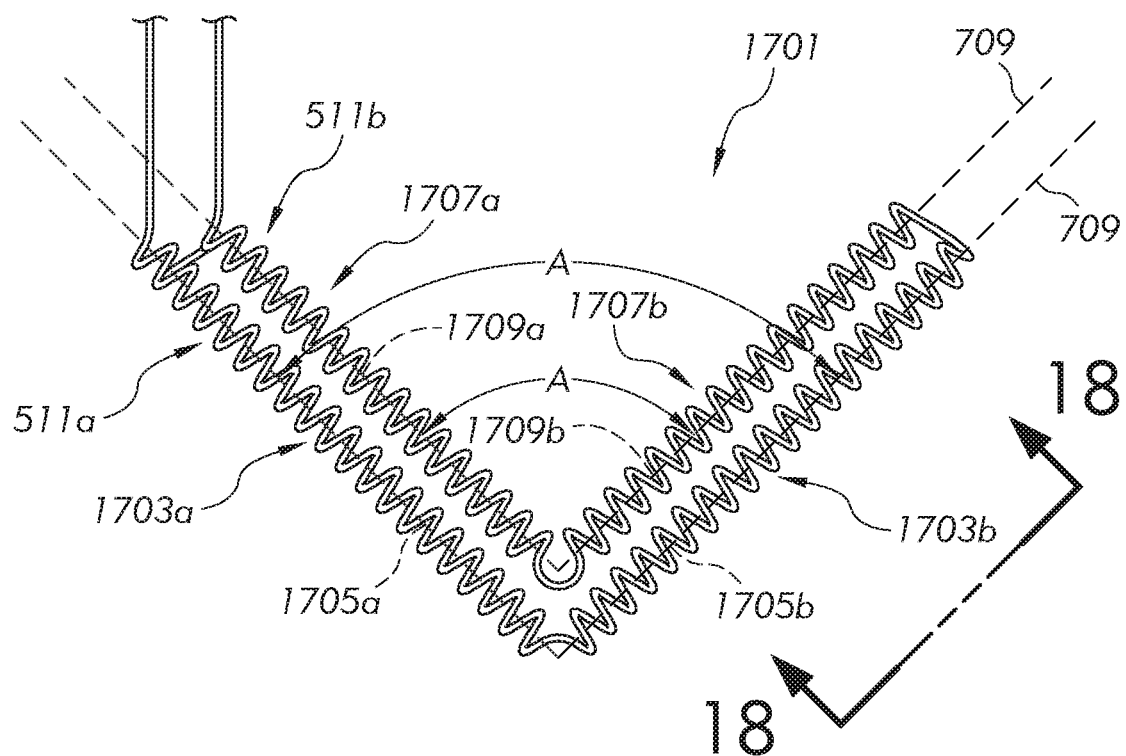
FIG. 17 is a top view of another embodiment of a heating element.
Figure 18:
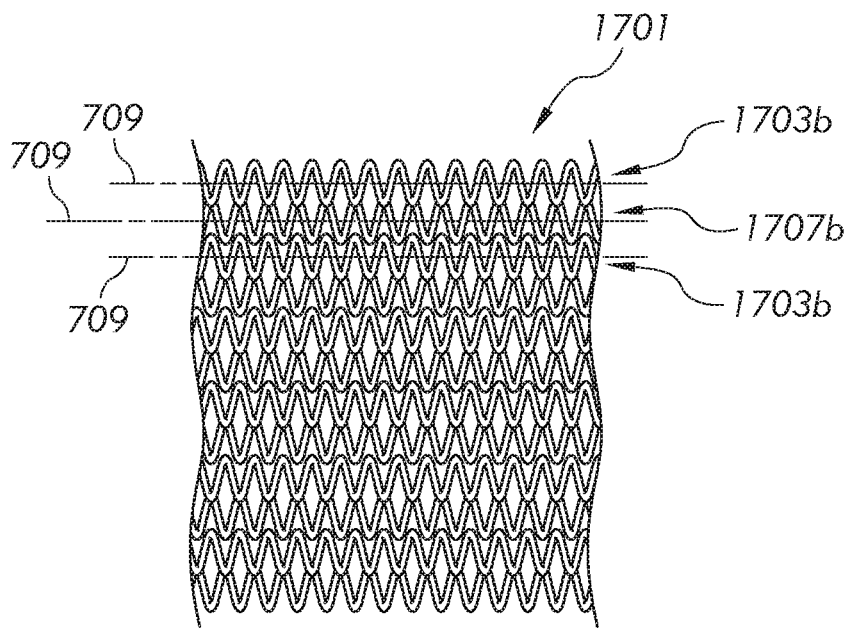
FIG. 18 is a partial front view of the heating element along line 18-18 of FIG. 17.

FIGS. 17 and 18 illustrate another embodiment of a heating element 1701 comprising heating coils of wire that, unless otherwise noted, may be similar or identical to the heating coils of wire of the heating element 601 discussed above. However, the axis of the heating coils of wire of the heating element 1701 are located at a 90° relative to the axis of the heating coils of wire of the heating element 601. As shown in FIG. 17, a first set of outer heating coils of wire 1703a of the outer heating segments 511a may be aligned relative to one another with its coil axes 709 parallel with respect to one another and extending along a first outer common plane 1705a. Likewise, a second set of outer heating coils of wire 1703b of the outer heating segments 511a may be aligned relative to one another with its coil axes 709 parallel with respect to one another and extending along a second outer common plane 1705b. Similarly, a first set of inner heating coils of wire 1707a of the inner heating segments 511b may be aligned relative to one another with its coil axes 709 parallel with respect to one another and extending along a first inner common plane 1709a. Likewise, a second set of inner heating coils of wire 1707b of the inner heating segments 511b may be aligned relative to one another with its coil axes 709 parallel with respect to one another and extending along a second inner common plane 1709b.

As shown in FIG. 18, like FIG. 6, the inner heating coils of wire may be staggered relative to the outer heating coils of wire. Indeed, in some embodiments, the first set of inner heating coils of wire 1707a of the inner heating segments 511b can be staggered relative to the first set of outer heating coils of wire 1703a of the outer heating segments 511a. Likewise, the second set of inner heating coils of wire 1707b of the inner heating segments 511b can be staggered relative to the second set of outer heating coils of wire 1703b of the outer heating segments 511a.

Figure 19:
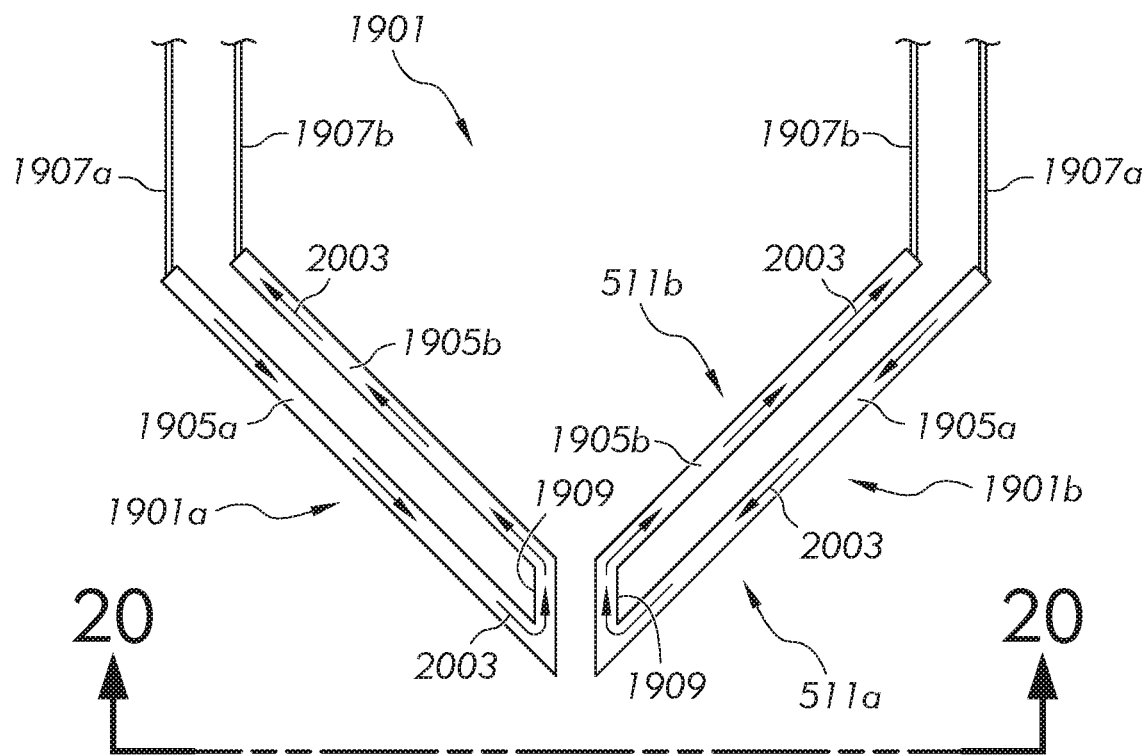
FIG. 19 is a top view of still another embodiment of a heating element.
Figure 20:
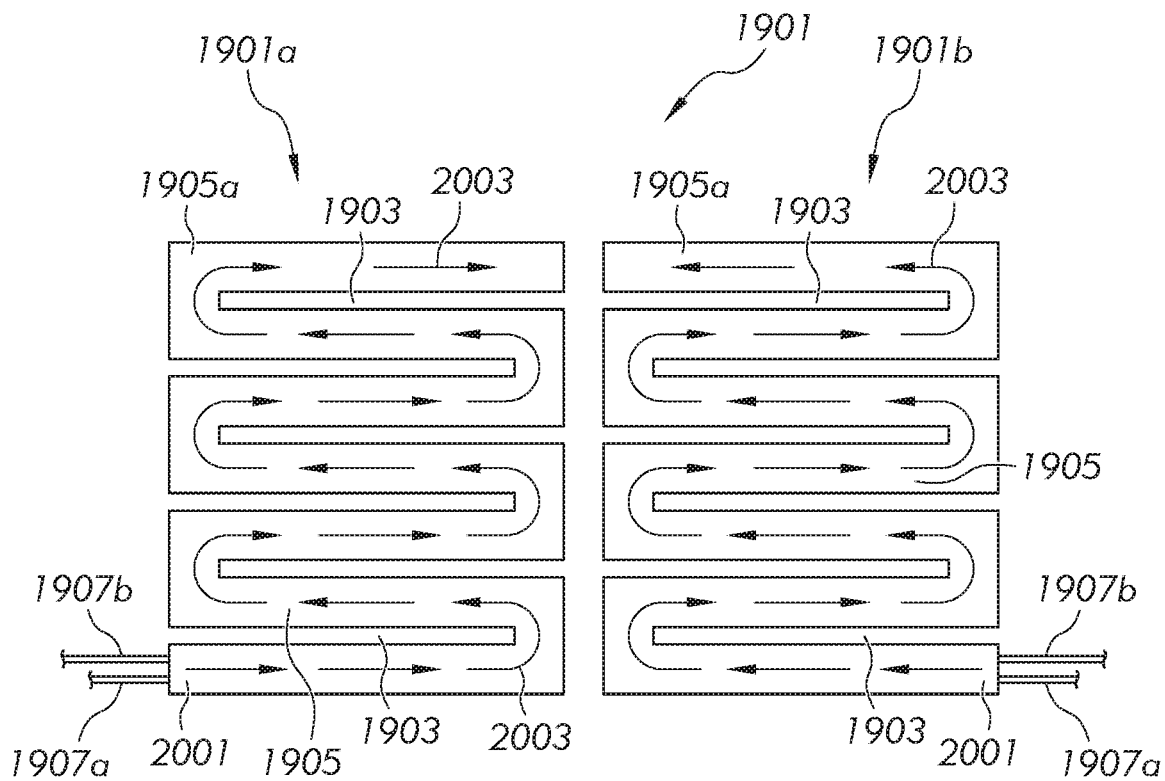
FIG. 20 is a front view of the heating element along line 20-20 of FIG. 19.

FIGS. 19 and 20 illustrate yet another embodiment of a heating element 1901. As shown, the heating element 1901 can be divided into a first heating element 1901a and a second heating element 1901b that may be operated independently from the first heating element. In alternative embodiments, although not shown, the heating element 1901 may be provided as a single heating element. Furthermore, although not shown, the heating element 601, 1701 may be divided (e.g., like heating element 1901) into two or more heating elements. Providing a single heating element may simplify design and reduce components. However, multiple heating elements, in some embodiments, can allow more consistent heating along all portions of the heating elements and/or symmetrically consistent heating along all portions of the heating elements.

As shown in FIGS. 19-20, the second heating element 1901b may be mirror image or can even be identical to the first heating element 1901a. Each of the first and second heating element 1901a, 1901b may be defined by a relatively thin plate formed from platinum, platinum alloy or other material capable of maintaining integrity at elevated temperatures. Slots 1903 may be machined from the plate, such as the illustrated planar plate, leaving behind a plurality of heating segments 1905 that can define a serpentine shape and, as shown, may extend along a common plane. Furthermore, multiple layers of heating segments 1905 may be provided, each along its own common plane. As shown, two layers of heating segments 1905 are provided although a single or three or more layers of segments may be provided in further embodiments.

In the illustrated embodiment, each heating element 1901a, 1901b can be provided with outer heating segments 1905a extending along a first plane and an inner heating segments 1905b extending along a second plane offset from the first plane. In operation, electrical current can be provided by input electrical wire 1907a to a first end 2001 (See FIG. 20). The electrical current can then heat the outer segments 1905a as the electrical current travels along an upward serpentine path (as shown by arrow 2003 in FIG. 20). The electrical current then travels through link 1909 connecting the second end of the outer heating segments 1905a to a first end of the inner heating segments 1905b. Then the electrical current heats the inner heating segments 1905b as the electrical current travels along a downward serpentine path (not shown) from the first end of the segment 1905b to a second end of the segment and then out through the output electrical wire 1907b.

Figure 8:
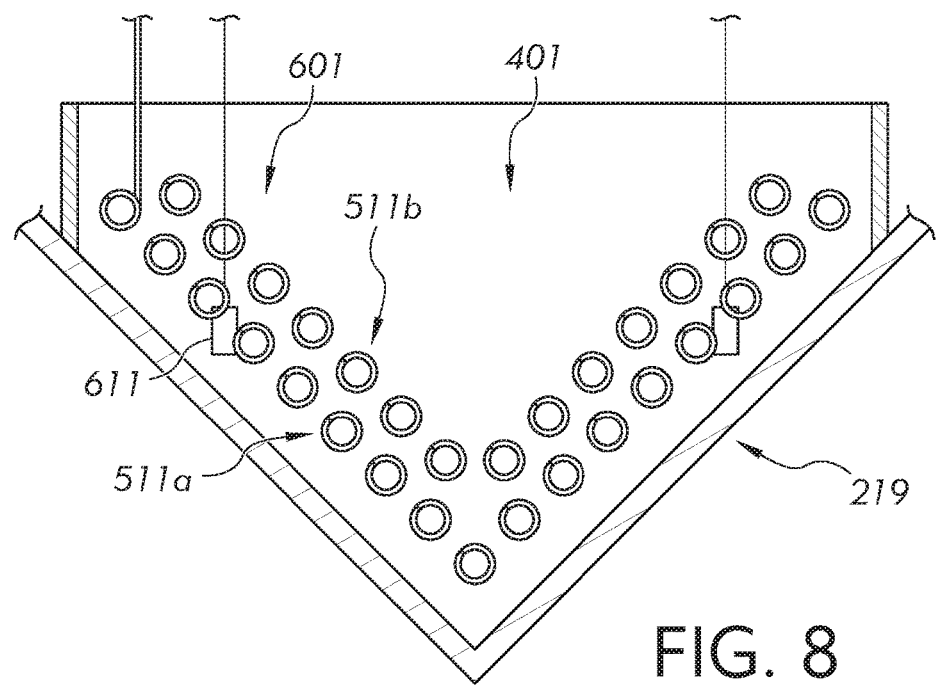

FIGS. 6-9 illustrate one embodiment of fabricating an apparatus including any of the above-referenced heating devices. As shown in FIG. 6, optionally sensors 611 may be positioned within the interior cavity 401. The heating element 601, 1701, 1901 may then be inserted into the interior cavity and appropriately positioned relative to the interior surfaces 501a, 501b as shown in FIG. 8. For simplicity of illustration, FIG. 8 depicts a cross section of the heating element 601 of FIG. 6. Furthermore, although heating element 601 is shown, in further embodiments any of the heating elements 601, 1701, 1901 may be provided in accordance with embodiments of the disclosure. Positioning of the heating elements 601, 1701, 1901 within the interior cavity 401 arranges the plurality of heating segments 511a, 511b at an orientation relative to one another within the interior cavity 401 of the edge director 211a, 211b.

Figure 9:
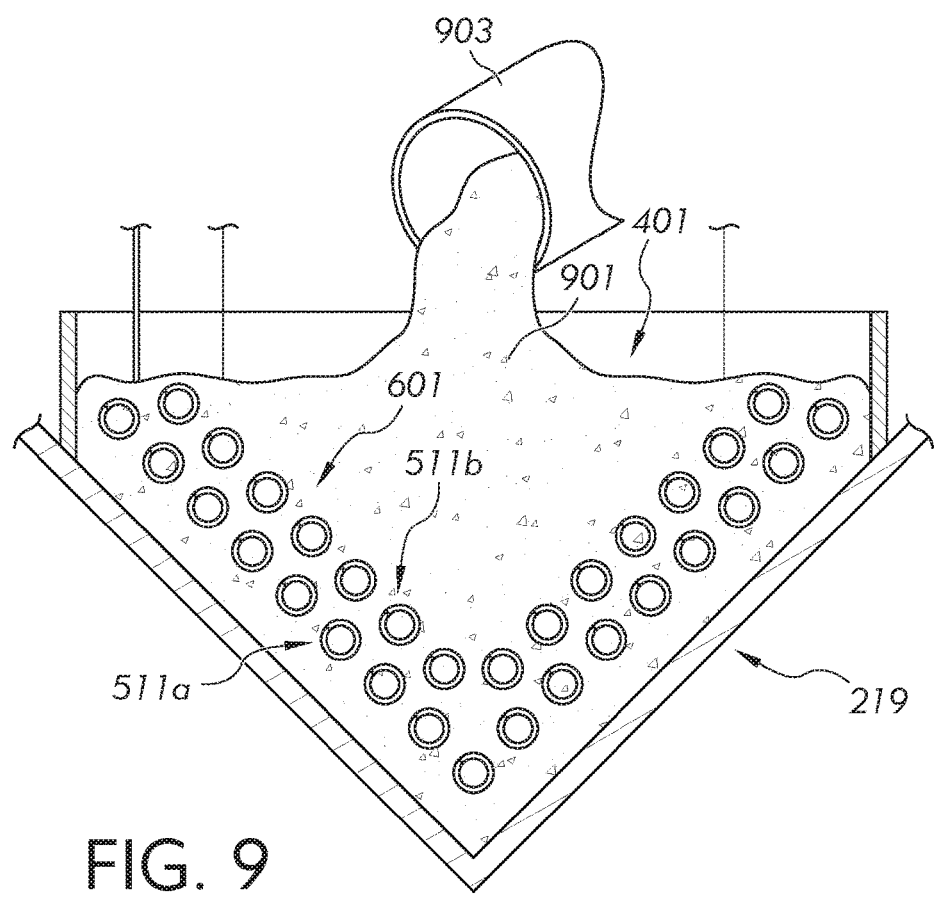

As shown in FIG. 9, material 901 (e.g., cement) may then be poured or otherwise introduced with a source 903 of the material (e.g., the illustrated nozzle) to move the material around the heating segments 511a, 511b within the interior cavity 401 of the edge director 211a, 211b to at least partially encapsulate the heating segments within a common body of the material within the interior cavity 401 of the edge director 211a, 211b. Indeed, as shown in FIG. 9, all of the heating segments can be entirely encapsulated within a common body of the material that was moved around the plurality of heating segments 511a, 511b within the interior cavity 401. Once the material 901 is moved into place, the common body of the material 901 can be converted into the monolithic block 513 of solid material, as shown in FIG. 5, while being positioned within the interior cavity 401 of the edge director 211a, 211b. As shown in FIG. 5, the monolithic block 513 can include all of the heating segments 511a, 511b of the heating device 403.

Figure 10:
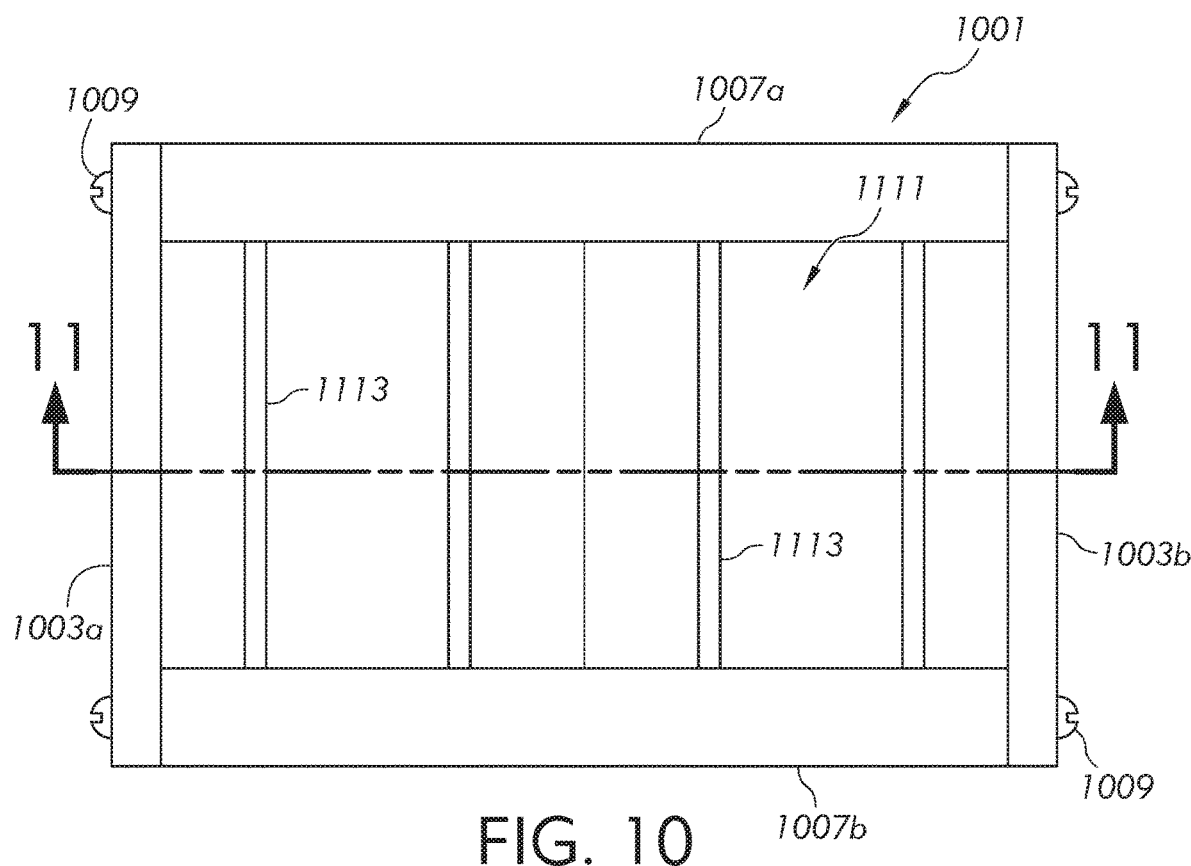
FIG. 10 is a top view of an embodiment of a mold.
Figure 11:
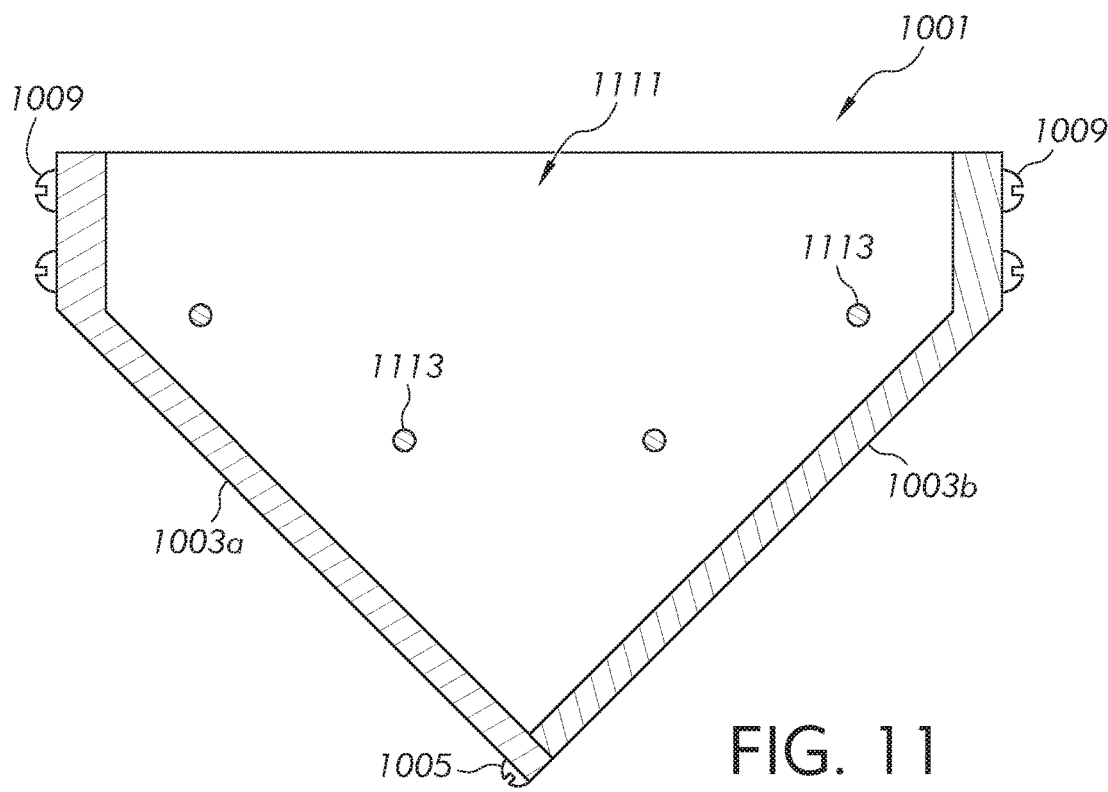
FIG. 11 is a cross-sectional view of the mold along line 11-11 of FIG. 10.

As discussed above, the embodiment of FIGS. 6-9 provide fabrication techniques where the body of material 901 may be converted into the monolithic block 513 while the body of material 901 is positioned within the interior cavity 401. FIGS. 10-16 illustrate another embodiment of positioning the heating device 403 into the interior cavity 401 after converting the body of material into the monolithic block 513. One possible technique of preforming the monolithic block can employ a mold. FIGS. 10-11 illustrate one embodiment of a mold 1001 including sidewalls 1003a, 1003b that can be attached together by fasteners 1005. Top and bottom walls 1007a, 1007b may further be attached to the sidewalls 1003a, 1003b by fasteners 1009. As such, once fastened together the interior surfaces of the top wall 1007a, bottom wall 1007b and sidewalls 1003a, 1003b define forming cavity 1111. In some embodiments, the size and shape of the forming cavity 1111 can closely follow the size and shape of the interior cavity 401 of the edge directors 211a, 211b. As such, the monolithic block 513 cast within the forming cavity 1111 can be received with the interior cavity 401 of the edge directors 211a, 211b. Furthermore, the matching size and shape can promote heat transfer between the heating device 403 and the lower portion 219 of the edge directors 211a, 211b due to contact between exterior surfaces of the monolithic block 513 and the interior surfaces of the interior cavity 401. Optionally, openings (not shown) in the top wall 1007a and bottom wall 1007b can be designed to receive end portions of optional alignment pins 1113 to orient the alignment pins 1113 within predetermined positions within the forming cavity 1111.

Figure 12:
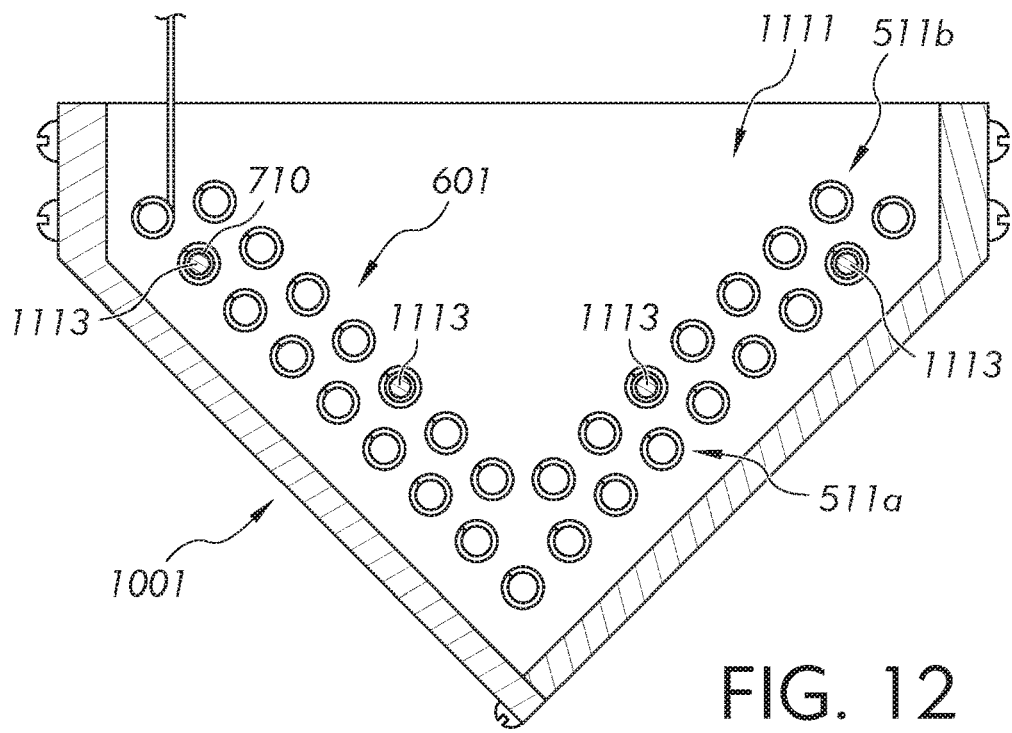
FIGS. 12-16 illustrate features of another example embodiment of methods of fabricating the edge directors of FIGS. 1-5.

Turning to FIG. 12, the method can include arranging the plurality of heating segments 511a, 511b at an orientation relative to one another within the forming cavity 1111 of the mold 1001. In the illustrated embodiment, the heating element 601 is illustrated although other heating elements (e.g., heating elements 1701, 1901) may be provided in further embodiments. In some embodiments, features of the mold may interact with the heating element to provide appropriate orientation of the heating element within the forming cavity. For example, as shown in FIG. 12 at least one alignment pin, such as the illustrated four alignment pins 1113, interacts with at least one heating segment of the plurality of heating segments to arrange the plurality of heating segments at the orientation relative to one another. Indeed, in some embodiments, one of the top wall 1007*a* and bottom wall 1007*b* can be removed and then the heating element can be inserted into the cavity while the alignment pins 1113 are received within the central axial path 710 at least one or several (e.g., four as illustrated) of the heating coils of wire. Once the alignment pins 1113 are received, the windings of the corresponding coil of wire are wound about the corresponding alignment pin 1113. Once positioned, the removed top or bottom wall 1007*a*, 1007*b* can be reattached with the heating element 601 thereby locked into the correct orientation relative to the forming cavity 1111 based on the interaction of the alignment pins with the heating coils of wire. In some embodiments, the alignment pins may comprise material that is the same or similar to the material of the monolithic block. In some embodiments, the alignment pins may be integrated as a permanent part of the cast monolithic block 513.

Figure 13:
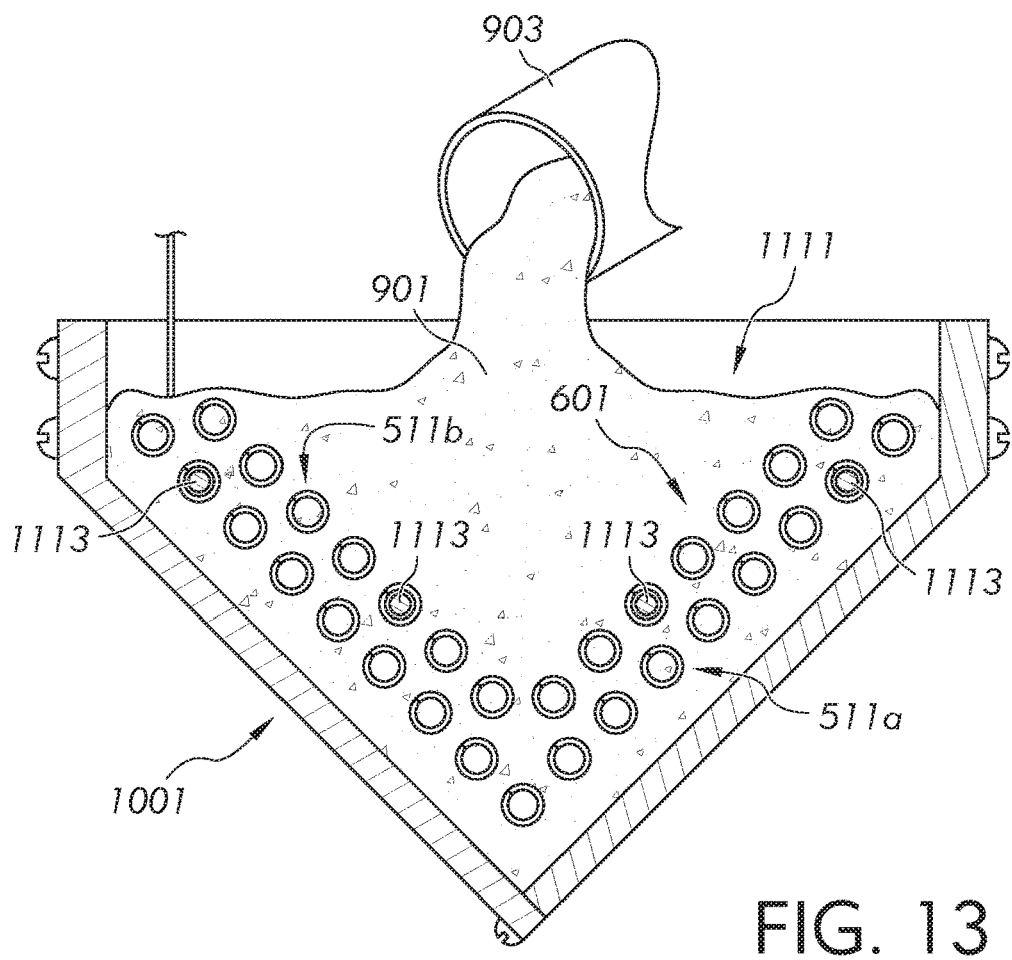
Figure 14:
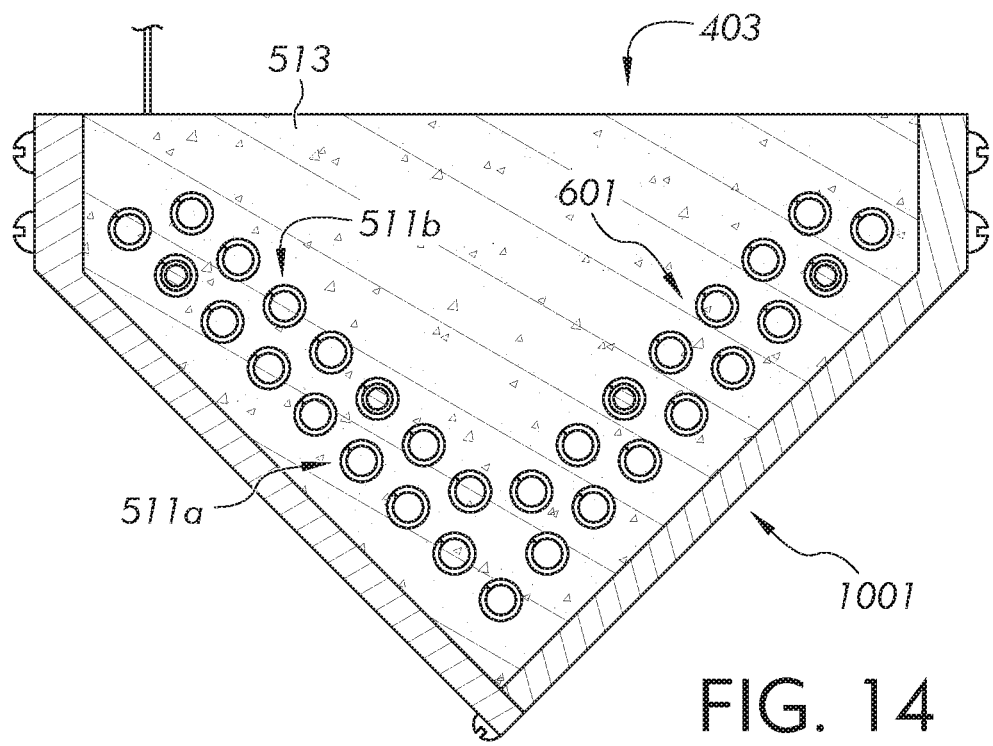

As shown in FIG. 13, material 901 (e.g., cement) may then be poured or otherwise introduced with the source 903 of the material to move the material around the heating segments 511*a*, 511*b* within the forming cavity 1111 of the mold 1001 to at least partially encapsulate the heating segments within a common body of the material within the forming cavity 1111 of the mold 1001. Indeed, as shown in FIG. 13, all of the heating segments can be entirely encapsulated within a common body of the material that was moved around the plurality of heating segments 511*a*, 511*b* within the forming cavity 1111 of the mold 1001. Once the material 901 is moved into place, the common body of the material 901 can be converted into the monolithic block 513 of solid material, as shown in FIG. 14, while being positioned within the forming cavity 1111 of the mold 1001. As shown in FIG. 14, the monolithic block 513 can include all of the heating segments 511*a*, 511*b* of the heating device 403.

Figure 15:
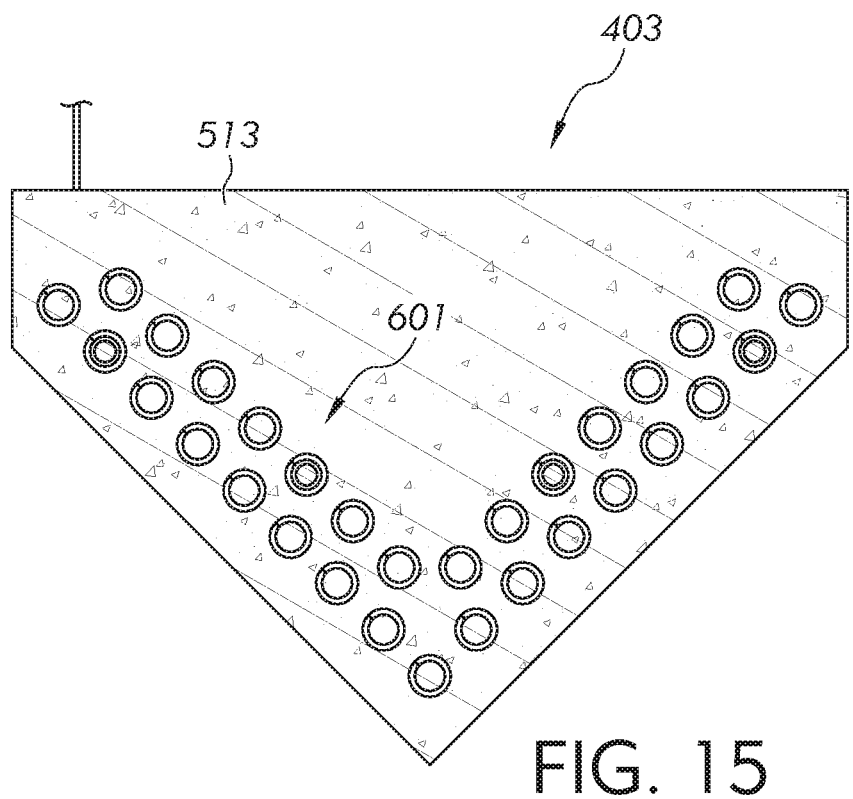
Figure 16:
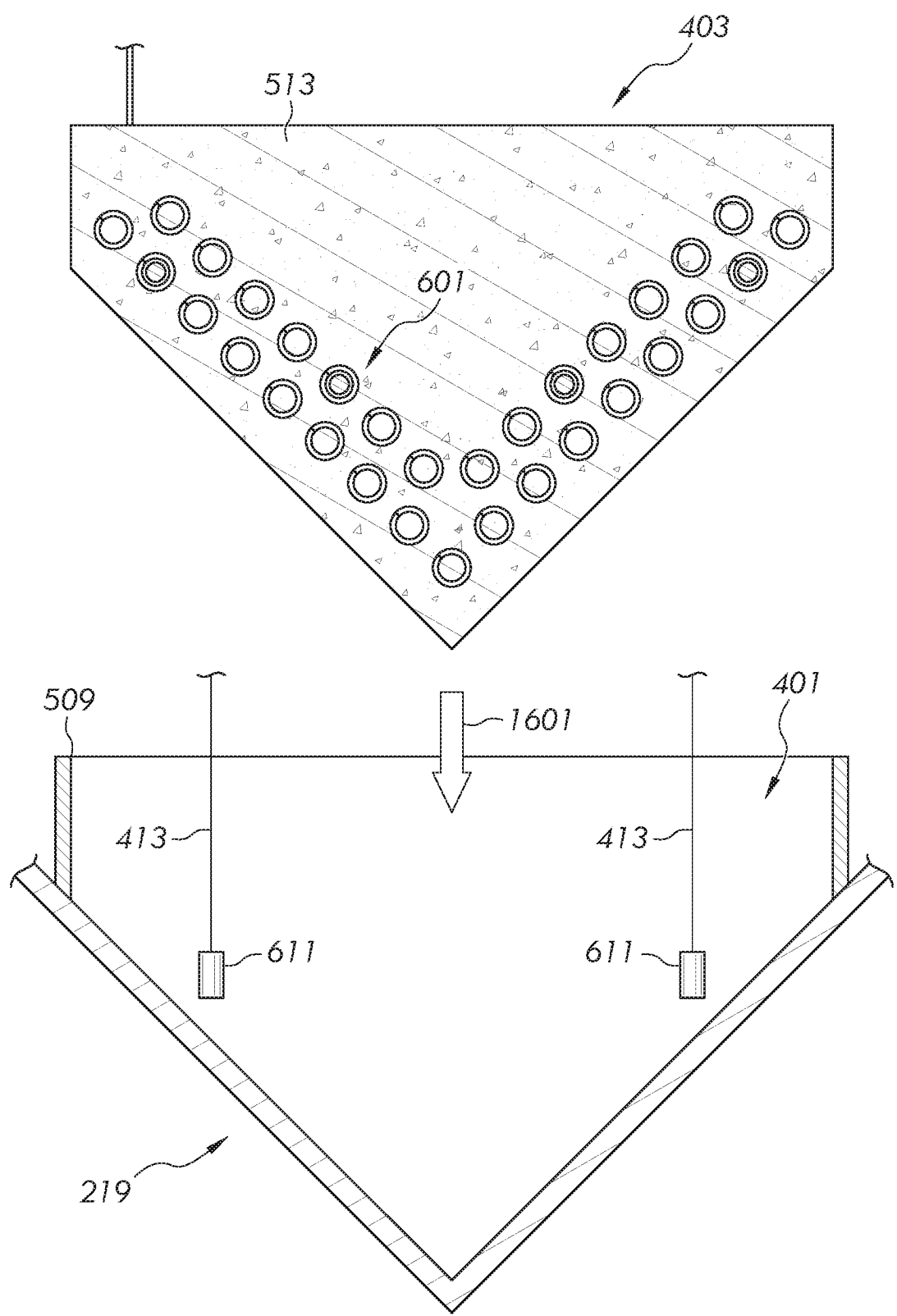

As shown in FIG. 15, in some embodiments, the method can further include removing the mold 1001 from the monolithic block 513 after the monolithic block is cast into a solid form and prior to positioning the heating device 403 within the interior cavity 401. As shown in FIG. 16, the heating device 403 can be positioned within the interior cavity 401 after converting the body of material 901 into the monolithic block 513 within the forming cavity 1111 of the mold 1001. Indeed, the monolithic block 513 can be inserted in linear direction 1601 into the opening 509 into the interior cavity 401 to the position shown in FIG. 5. Optionally, the bracket 411 may then be mounted to help maintain the heating device 403 within the interior cavity 401.

Referring to FIG. 4, in operation, signals from temperature sensors 611 (see FIG. 6) can be transmitted by way of communication lines 413 to a control device 415. The control device 415 may be a programmable logic controller and may be configured to (e.g., "programmed to", "encoded to", designed to", and/or "made to") send a signal to regulator 417 to regulate the amount of direct current provided to the circuit by the source 419 of direct current based on signals received from the temperature sensors 611. Referring to FIG. 5, the temperature of the heating segments 511*a*, 511*b* can therefore be controlled by regulating the electrical current flowing through the heating segments 511*a*, 511*b*. Heat from the heating segments can pass through the thermally conductive monolithic block 513 to the interior surface 501*a*, 501*b* of the walls 503*a*, 503*b* of the lower portion 219 of the edge directors 211*a*, 211*b*. The heat may then be conducted through the walls 503*a*, 503*b* from the interior surfaces 501*a*, 501*b* to the outwardly facing contact surfaces 221*a*, 221*b*. The outwardly facing contact surfaces 221*a*, 221*b* may therefore be heated to a temperature that discourages or prevents devitrification of glass onto the outwardly facing contact surfaces 221*a*, 221*b*. At the same time, the control device 415 can regulate the temperature to avoid overheating of the outwardly facing contact surfaces 221*a*, 221*b* that may result in overheating of the molten glass passing over the outwardly facing contact surfaces 221*a*, 221*b* that might otherwise result in undesired attenuation of the width "W" of the glass ribbon 103.

As mentioned previously, embodiments of the disclosure may be provided with the optional monolithic block 513. As further mentioned above, in some embodiments, the heating segments 511*a*, 511*b* may optionally include a plurality of coils of wire 603*a*, 603*b*. Regardless of whether a monolithic block 513 is provided, the plurality of coils of wire 603*a*, 603*b* may be positioned within the interior cavity with windings that are wound about the linear coil axis 709 that can extend in the downstream direction that the pair of inclined surface portions 207*a*, 207*b* of the forming wedge 209 converge along to form the root 145 of the wedge 209. In some embodiments, the downstream direction can comprise the draw direction 157. Thus, as can be appreciated in FIGS. 4, 5 and 7, once the plurality of coils of wire 603*a*, 603*b* are installed within the interior cavity 401 and the edge directors are installed with respect to the forming wedge 209, the linear coil axis 709 of the central axial path 710 of each of the plurality of coils of wire 603*a*, 603*b* may extend in the downstream direction (e.g., draw direction 157). In some embodiments, as shown in FIG. 7, the linear coil axis 709 of the central axial path 701 may extend in the downstream direction wherein a directional component of the linear coil axis 709 extends in the downstream direction such that an angle other than a 90° exists between the linear coil axis 709 and the downstream direction. As further shown in FIG. 7, in some embodiments, the linear coil axis 709 of the central axial path 701 may extend in a direction that is coincident with the downstream direction where a 0° angle exists between the linear coil axis 709 and the downstream direction. Providing the linear coil axis 709 of the central axial path 701 of each of the plurality of coils of wire 603*a*, 603*b* extending in the downstream direction (e.g., at an angle not equal to 90° such as 0°) can facilitate placement of the plurality of coils of wire 603*a*, 603*b* relative to the interior cavity 401 and/or can facilitate maintenance of a desired orientation of the coils of wire 603*a*, 603*b* in embodiments that involve moving material around the plurality of coils of wire to at least partially encapsulate each of the plurality of coils of wire within a common body of material prior to converting the common body of the material into the monolithic block. Indeed, such an orientation can simplify use of the alignment pins 1113 to orient the coils of wire without the ends of the alignment pins extending to the walls 503*a*, 503*b* of the edge directors, thereby avoiding possible interference of heat transfer efficiency of the coils of wire to the walls 503*a*, 503*b*. To achieve this orientation, in some embodiments, the alignment pins 1113 can interact with the top and bottom walls 1007*a*, 1007*b* of the mold (see FIG. 10) without engaging the sidewalls 1003*a*, 1003*b*, thereby facilitating placement of the alignment pins 1113 away from the surfaces of the monolithic block 513 facing the interior surface 501*a*, 501*b* of the walls 503*a*, 503*b*.

In some embodiments, one or more alignment pins 1113 may be provided with or without a mold. In some embodiments, at least one coil of wire comprises windings that are wound about the alignment pin 1113 having the alignment axis that can extend in the downstream direction along with the linear coil axis 709 of the central axial path 701 as discussed above. In some embodiments, methods can include inserting at least one alignment pin 1113 through a central axial path 710 of at least one of the plurality of coils of wire and mounting the alignment pin to the mold 1001 to align the plurality of coils of wire at a predetermined orientation within the forming cavity 1111 of the mold 1001.

In some embodiments, the plurality of coils of wire can be each at least partially encapsulated within the monolithic block 513 positioned within the interior cavity 401 of the edge directors. In some embodiments, material 901 may be moved around the plurality of coils of wire to at least partially encapsulate the plurality of coils of wire within a common body of the material as shown in FIGS. 9 and 13. The common body of material can then be converted into the monolithic block 513 containing each of the plurality of coils of wire as shown in FIGS. 5 and 14-16.

For example, as shown in FIG. 5, each of the plurality of coils of wire can be arranged within the interior cavity 401 of the edge director. As shown in FIG. 9, the material 901 can be moved around each of the plurality of coils of wire within the interior cavity 401 of the edge director such that the common body of the material is contained within the interior cavity of the edge director. If provided, the alignment pin(s) 1113 may help maintain the desired orientation of the plurality of coils of wire within the interior cavity 401 while the material 901 is moved around each of the plurality of coils of wire. As shown in FIG. 5, the common body of the material may be converted into the monolithic block 513 while being positioned within the interior cavity 401 of the edge director.

In some embodiments, each of the plurality of coils of wire may be positioned within the interior cavity 401 after converting the common body of the material 901 into the monolithic block 513. As shown, in FIG. 12, the method can include arranging each of the plurality of coils of wire within the forming cavity 1111 of the mold. In some embodiments, the arranging can include inserting the at least one alignment pin 1113 through the central axial path 710 mounting the alignment pin 1113 to the mold (e.g., top and bottom walls 1007a, 1007b) to align the plurality of coils of wire at a predetermined orientation within the forming cavity 1111 of the mold 1001. As shown in FIG. 13, the method can further include moving the material 901 around each of the plurality of coils of wire to at least partially encapsulate each of the plurality of coils of wire within the common body of the material 901. If provided, the alignment pin(s) 1113 may help maintain the desired orientation of the plurality of coils of wire within the forming cavity 1111 of the mold 1001 while the material 901 is moved around each of the plurality of coils of wire. As shown in FIG. 14, the method can then include converting the common body of the material 901 into the monolithic block 513 while each of the plurality of coils of wire is positioned within the forming cavity 1111 of the mold 1001.

As shown in FIG. 15, in some embodiments, the method can further include removing the mole 1001 from the monolithic block 513 prior to positioning each of the plurality of coils of wire within the interior cavity 1111.

Embodiments and the functional operations described herein can be implemented in digital electronic circuitry, or in computer software, firmware, or hardware, including the structures disclosed in this specification and their structural equivalents, or in combinations of one or more of them. Embodiments described herein can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, or a combination of one or more of them.

The term "processor" or "controller" can encompass all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes described herein can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit) to name a few.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), to name just a few.

Computer readable media suitable for storing computer program instructions and data include all forms data memory including nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments described herein can be implemented on a computer having a display device, e.g., a CRT (cathode ray tube) or LCD (liquid crystal display) monitor, and the like for displaying information to the user and a keyboard and a pointing device, e.g., a mouse or a trackball, or a touch screen by which the user can provide input to the computer. Other kinds of devices can be used to provide for interaction with a user as well; for example, input from the user can be received in any form, including acoustic, speech, or tactile input.

Embodiments described herein can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described herein, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Likewise, a "plurality" is intended to denote "more than one."

Ranges can be expressed herein as from "about" one particular value, and/or to "about" another particular value. When such a range is expressed, embodiments include from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to an apparatus that comprises A+B+C include embodiments where an apparatus consists of A+B+C and embodiments where an apparatus consists essentially of A+B+C.

It will be apparent to those skilled in the art that various modifications and variations can be made to the present disclosure without departing from the spirit and scope of the appended claims. Thus, it is intended that the present disclosure cover the modifications and variations of the embodiments herein provided they come within the scope of the appended claims and their equivalents.

What is claimed is:

1. An apparatus comprising:
a wedge comprising a pair of inclined surface portions converging along a downstream direction to form a root of the wedge;
an edge director intersecting with at least one of the pair of inclined surface portions, the edge director comprising an interior cavity defined by a first interior surface of a first wall of a lower portion of the edge director and a second interior surface of a second wall of the lower portion of the edge director; and
a heating device positioned within the interior cavity, the heating device comprising a plurality of heating segments electrically connected in series and encapsulated within a monolithic block, a shape of an exterior surface of the monolithic block matching a shape defined by the first interior surface and the second interior surface, and a size of the interior cavity matching a size of the monolithic block, wherein the monolithic block fills the interior cavity.

2. The apparatus of claim 1, wherein the monolithic block comprises cement.

3. The apparatus of claim 1, wherein the monolithic block comprises alumina.

4. The apparatus of claim 3, wherein the alumina comprises from 95% to 98% of the monolithic block.

5. The apparatus of claim 1, wherein each heating segment of the plurality of heating segments comprises a coil of wire comprising windings that are wound along a coil axis.

6. The apparatus of claim 5, wherein the windings of at least one coil of wire of the plurality of coils of wire are wound about an alignment pin.

7. The apparatus of claim 5, wherein each coil axis of the plurality of coils of wire extends along a common direction, and the coil axes of the plurality of coils of wire are spaced apart and parallel with respect to one another.

8. The apparatus of claim 1, wherein the plurality of heating segments comprises a first set of heating segments, each heating segment of the first set of heating segments comprises a central axis aligned along a first row.

9. The apparatus of claim 8, wherein the central axis of each heating segment of the first set of heating segments is spaced a first distance from the first interior surface of the first wall of the lower portion of the edge director.

10. The apparatus of claim 8, wherein the plurality of heating segments comprises a second set of heating segments, each heating segment of the second set of heating segments comprises a central axis aligned along a second row offset from the first row.

11. The apparatus of claim 10, wherein the second set of heating segments is staggered relative to the first set of heating segments.

12. The apparatus of claim 10, wherein the central axis of each heating segment of the first set of heating segments is spaced a first distance from the first interior surface of the first wall of the lower portion of the edge director, and the central axis of each heating segment of the second set of heating segments is spaced a second distance from the first interior surface of the first wall of the lower portion of the edge director, wherein the first distance is less than the second distance.

13. An apparatus comprising:
a wedge comprising a pair of inclined surface portions converging along a downstream direction to form a root of the wedge;
an edge director intersecting with at least one of the pair of inclined surface portions, the edge director comprising an interior cavity defined by a first interior surface of a first wall of a lower portion of the edge director and a second interior surface of a second wall of the lower portion of the edge director; and
a heating device positioned within the interior cavity, the heating device comprising a plurality of coils of wire electrically connected in series each coil of wire of the plurality of coils of wire comprising windings that are coiled along a coil axis, each coil axis of the plurality of coils of wire extending along a common direction, the coil axes of the plurality of coils of wire are spaced apart and parallel with respect to one another, the plurality of coils of wire comprising a first set of coils of wire, the coil axis of each coil of wire of the first set of coils of wire is aligned along a first row and spaced a first distance from the first interior surface of the first wall of the lower portion of the edge director.

14. The apparatus of claim 13, wherein the plurality of coils of wire comprises a second set of coils of wire, the coil axis of each coil of wire of the second set of coils of wire is aligned along a second row offset from the first row.

15. The apparatus of claim 14, wherein the second set of coils of wire is staggered relative to the first set of coils of wire.

16. The apparatus of claim 14, wherein the coil axis of each coil of wire of the second set of coils of wire is spaced a second distance from the first interior surface of the first wall of the lower portion of the edge director, wherein the first distance is less than the second distance.

17. The apparatus of claim 13, wherein each coil of wire of the plurality of coils of wire is encapsulated within a monolithic block positioned within the interior cavity.

18. The apparatus of claim 17, wherein a shape of an exterior surface of the monolithic block matches a shape defined by the first interior surface and the second interior surface, a size of the interior cavity matches a size of the monolithic block, and the monolithic block fills the interior cavity.

19. The apparatus of claim 17, wherein the monolithic block comprises cement or alumina.

20. The apparatus of claim 17, wherein alumina comprises from 95% to 98% of the monolithic block.

* * * * *

UNITED STATES PATENT AND TRADEMARK OFFICE
CERTIFICATE OF CORRECTION

PATENT NO. : 11,440,830 B2
APPLICATION NO. : 16/608300
DATED : September 13, 2022
INVENTOR(S) : Chao Feng Hsiao et al.

It is certified that error appears in the above-identified patent and that said Letters Patent is hereby corrected as shown below:

In the Claims

In Column 21, Line 28, in Claim 13, delete "series" and insert -- series, --.

Signed and Sealed this
Twenty-second Day of November, 2022

Katherine Kelly Vidal
*Director of the United States Patent and Trademark Office*